(12) United States Patent
Lawson

(10) Patent No.: US 9,330,560 B2
(45) Date of Patent: May 3, 2016

(54) RECONFIGURABLE EQUIPMENT MONITORING SYSTEMS AND METHODS

(71) Applicant: FLOWSERVE MANAGEMENT COMPANY, Irving, TX (US)

(72) Inventor: Rick Lawson, Spring, TX (US)

(73) Assignee: Flowserve Management Company, Irving, TX (US)

(*) Notice: Subject to any disclaimer, the term of this patent is extended or adjusted under 35 U.S.C. 154(b) by 280 days.

(21) Appl. No.: 13/886,266

(22) Filed: May 2, 2013

(65) Prior Publication Data

US 2014/0028462 A1    Jan. 30, 2014

Related U.S. Application Data

(60) Provisional application No. 61/641,383, filed on May 2, 2012.

(51) Int. Cl.
*G08C 17/02* (2006.01)
*H04Q 9/00* (2006.01)

(52) U.S. Cl.
CPC ............. *G08C 17/02* (2013.01); *H04Q 9/00* (2013.01); *H04Q 2209/823* (2013.01); *H04Q 2209/826* (2013.01)

(58) Field of Classification Search
CPC .............. H04Q 2209/823; H04Q 9/00; H04Q 2209/826
See application file for complete search history.

(56) References Cited

U.S. PATENT DOCUMENTS

| | | | |
|---|---|---|---|
| 4,164,149 A | 8/1979 | Okubo | 73/594 |
| 4,245,370 A | 1/1981 | Baker | 15/319 |
| 4,367,506 A | 1/1983 | Lapsker | 361/31 |
| 4,399,513 A | 8/1983 | Sullivan et al. | 702/182 |

(Continued)

FOREIGN PATENT DOCUMENTS

CN    1081323    3/2002    ............ G01H 1/00

OTHER PUBLICATIONS

"Flowserve Introduces IPS Beacon Condition Monitor," Flowserve, Press Release, URL: http://flowserve.com/About-Flowserve/News-%26-Events/Press-Releases/Flowserve-Introduces-IPS-Beacon-Condition-Monitor%2Cen_US, 6 pages, Jun. 18, 2012.

(Continued)

*Primary Examiner* — Benjamin C Lee
*Assistant Examiner* — Rajsheed Black-Childress
(74) *Attorney, Agent, or Firm* — Dinsmore & Shohl LLP

(57) ABSTRACT

A method for reconfiguring an equipment monitoring system may include (a) providing a monitoring device including sensor(s) configured to monitor a particular device; and a processor configured to analyze the sensor data collected by the sensor(s) to determine a status of the particular device, and control one or more status indicators to display the determined status; (b) connecting a removable memory module to the monitoring device, which memory module receives and stores sensor data from the monitoring device sensor(s); (c) connecting a removable wireless transmitter module to the monitoring device or the removable memory module, (d) connecting the removable wireless transmitter module to additional source(s) of sensor data; (e) receiving at the removable wireless transmitter module sensor data from the monitoring device sensor(s), and additional sensor data from the additional sensor data source(s); and (f) wirelessly transmitting both the sensor data and the additional sensor data to a wireless receiver.

16 Claims, 15 Drawing Sheets

(56) References Cited

U.S. PATENT DOCUMENTS

| | | | | |
|---|---|---|---|---|
| 4,467,260 | A | 8/1984 | Mallick, Jr. et al. | 318/800 |
| 4,506,218 | A | 3/1985 | Brown et al. | 324/765.01 |
| 5,189,350 | A | 2/1993 | Mallett et al. | 318/434 |
| 5,237,310 | A | 8/1993 | Smith | 340/679 |
| 5,336,996 | A | 8/1994 | Rusnak | 324/207.2 |
| 5,591,916 | A | 1/1997 | Byrne | 73/649 |
| 5,847,658 | A | 12/1998 | Irie et al. | 340/683 |
| 5,852,351 | A | 12/1998 | Canada et al. | 318/490 |
| 6,257,066 | B1 | 7/2001 | Chandler et al. | 73/660 |
| 6,297,742 | B1 * | 10/2001 | Canada et al. | 340/635 |
| 6,412,131 | B1 | 7/2002 | Zhao et al. | 73/659 |
| 6,672,168 | B2 | 1/2004 | Higgins et al. | 73/660 |
| 6,839,597 | B2 * | 1/2005 | Hattori et al. | 700/27 |
| 7,449,863 | B2 * | 11/2008 | Tashiro | 320/112 |
| 7,479,876 | B2 * | 1/2009 | Carle et al. | 340/539.17 |
| D586,670 | S | 2/2009 | Playford et al. | D10/49 |
| 8,154,417 | B2 | 4/2012 | Hauenstein et al. | 340/683 |
| 2002/0140566 | A1 | 10/2002 | Holroyd et al. | 340/679 |
| 2003/0043046 | A1 | 3/2003 | Watwood et al. | 340/683 |
| 2003/0112146 | A1 | 6/2003 | Sobel et al. | 340/635 |
| 2003/0159515 | A1 | 8/2003 | Tonomura | 73/584 |
| 2003/0171827 | A1 * | 9/2003 | Keyes et al. | 700/19 |
| 2004/0021669 | A1 * | 2/2004 | Fredlund et al. | 345/530 |
| 2004/0254652 | A1 * | 12/2004 | Ota et al. | 700/12 |
| 2005/0231350 | A1 | 10/2005 | Littrell et al. | 340/511 |
| 2005/0284226 | A1 | 12/2005 | Boda et al. | 73/660 |
| 2006/0265106 | A1 | 11/2006 | Giles et al. | 700/283 |
| 2009/0093975 | A1 | 4/2009 | Judd | 702/34 |
| 2011/0201229 | A1 * | 8/2011 | Matsumoto | G06K 7/0043 439/488 |

OTHER PUBLICATIONS

International Search Report, Application No. PCT/US2008/078266, 1 page, Dec. 8, 2008.

* cited by examiner

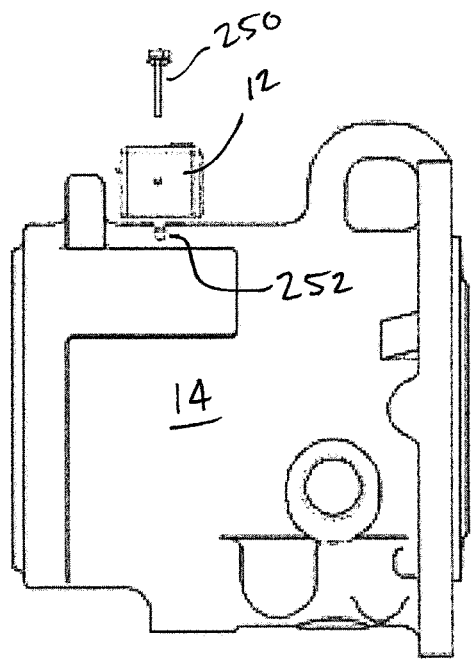
FIG. 12
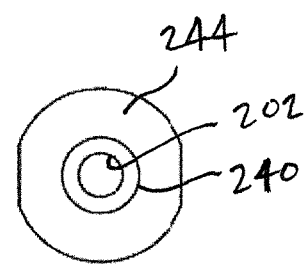
FIG. 13
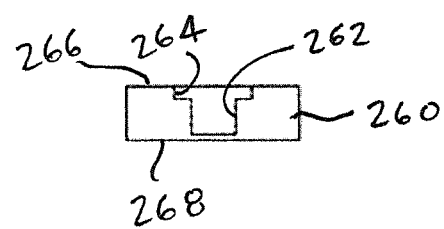

FIG. 17

RECONFIGURABLE EQUIPMENT MONITORING SYSTEMS AND METHODS

CROSS REFERENCE TO RELATED APPLICATIONS

This application claims the benefit of U.S. Provisional Application Ser. No. 61/641,383 filed May 2, 2012, which is hereby incorporated by reference in its entirety.

TECHNICAL FIELD

The present disclosure is related to equipment monitoring systems and methods, for example, reconfigurable monitoring systems and methods for monitoring the condition of pumps or other equipment.

BACKGROUND

It is estimated that less than 10% of all industry pump failures are attributable to normal pump bearing wear and fatigue. Thus, the bearing life of most pumps can be extended if the early warnings of improper behavior or conditions are detected prior to the pump failure, such that preventive action can be taken to extend the pump and/or pump bearing life, thus avoiding or reducing the often costly consequences of unpredictable pump failure. Thus, systems and methods are needed to simply and effectively provide early warning notification of future pump bearing failure.

In addition, many users of local monitoring systems have historically been suspect of remote monitoring systems, e.g., wireless systems, and consequently, have been reluctant to adopt remote monitoring systems for fear of data and/or signal loss. Thus, the conversion of local monitoring system users into remote monitoring system users has been difficult, if not impossible at times.

SUMMARY

Some embodiments provide a system for monitoring the condition of a component, comprising a monitoring device containing one or more sensors configured to collect sensor data regarding one or more operational parameters of the component; one or more status indicators; a processor configured to receive the sensor data collected by the one or more sensors, determine a status of the component based on the received sensor data, and control the one or more status indicators to display the determined status of the component; and a memory module removably coupled to the monitoring device and configured to periodically receive sensor data from the sensors, and store the periodically received sensor data.

Some embodiments provide a system for monitoring the condition of a component including (a) a monitoring device containing one or more sensors configured to collect sensor data regarding one or more operational parameters of the component; one or more status indicators; and a processor configured to receive the sensor data collected by the one or more sensors, determine a status of the component based on the received sensor data, and control the one or more status indicators to display the determined status of the component; (b) a wireless transmitter module configured to be removably coupled to the monitoring device and configured to periodically receive sensor data from the one or more sensors, and wirelessly transmit the periodically received sensor data for receipt by a receiving device; and (c) an additional memory module distinct from the memory module and removably coupled to the removable wireless transmitter, the removable memory module being configured to receive sensor data via a physical connection provided by the removable wireless transmitter module, and store the received sensor data.

Some embodiments provide a method for reconfiguring a monitoring system for monitoring the condition of one or more devices. The method may include (a) providing a monitoring device including one or more sensors configured to collect sensor data regarding one or more operational parameters of a particular device; one or more status indicators; and a processor configured to receive the sensor data collected by the one or more sensors, determine a status of the particular device based on the received sensor data, and control the one or more status indicators to display the determined status of the particular device; (b) connecting a removable memory module to the monitoring device, the removable memory module configured to periodically receive sensor data from the one or more sensors, and store the periodically received sensor data; (c) connecting a removable wireless transmitter module to the monitoring device or to the removable memory module, (d) connecting the removable wireless transmitter module to at least one additional source of sensor data; (e) receiving at the removable wireless transmitter module sensor data from the one or more sensors of the monitoring device, and additional sensor data from the at least one additional source of sensor data; and (f) wirelessly transmitting both the sensor data and the additional sensor data from the removable wireless transmitter module to a wireless receiver.

Thus, some embodiments provide systems and methods to simply and effectively provide local and/or remote early warning notification, enabling preventative action to extend the life of a monitored device, e.g., to extend the bearing life of a pump. Some embodiments provide data acquisition, logging, visual alert, and remote alert devices and systems that monitor various parameters, e.g., vibration (x-y-z axis), temperature, and/or other parameters. While some embodiments are directed to monitoring pumps and pump bearings, e.g., via vibration, other embodiments are applicable to the monitoring of other parameters and machines and/or systems other than pumps and pump systems, etc.

Some embodiments provide straightforward local visual status, alerts and/or warning notifications. For example, one embodiment related to monitoring pump vibration and/or temperature includes an intrinsically safe, e.g., battery powered, vibration monitoring device mounted on a pump bearing housing to measure and record vibration parameters and/or temperature parameters of the pump. These measured parameters are then compared to pre-set factory parameter range limits. When a parameter falls outside the pre-set factory range limits, an alert or alarm state is automatically triggered, and a time and date stamp of the event is logged.

Some embodiments provide flexible means to configure and expand the methods and systems by the end user. For example, some embodiments include an external USB docking device and PC-based software that provides the ability to change alarm set points and read all state of health data from the monitoring device, e.g., past alerts (time and date) for the corresponding x-y-z vibration and temperature values along with current battery voltage. As another example, some embodiments include a removable memory module to provide the monitoring device with expanded data logging capability. The data may be downloaded through the USB docking device to provide the user with each time-stamped measurement value for a particular duration, e.g., up to one year of readings, depending on the configuration of the monitoring device. As yet another example, some embodiments allow for easy retrofit capability, which may provide cost-effective status/condition monitoring of large populations of equipment, e.g., rotating equipment.

Some embodiments provide methods and systems to transform a local visual alert monitoring system into a more advanced remote wireless monitoring and alert/alarm system. For example, some embodiments provide a user with a method to transform a currently employed local monitoring and alert system into an automated remote wireless transmission monitoring and alert system by integrating an already-mounted and previously-used local alert configuration into a wireless network-based monitoring system. With this integration, the local data measured and recorded may be transmitted wirelessly, allowing the user instant remote access to information without having to be at the pump or other device to witness the visual alert and/or alarm.

Some embodiments also provide the ability to integrate the systems and methods into local wireless networks through a wireless repeater(s) and receiver/interface system. Integration of the data transmitted wirelessly may be seamless to either a local monitoring system or to other platforms. Through the platform, the customer can gain access to technical experts who also have access to the information. The personnel can assist plant operations in building custom performance monitoring solutions or with the identification of cost-effective corrective measures.

BRIEF DESCRIPTION OF THE DRAWINGS

Some embodiments of the disclosure may be understood by referring, in part, to the following description and the accompanying drawings wherein:

FIG. 12 shows an example monitoring device being mounted to a monitored device, e.g., a pump, using a bolt passing through a bolt through hole in the monitoring device and into a threaded hole formed in the monitored device, according to an example embodiment;

FIG. 13 shows an example mounting pad for mounting an example monitoring device, and an end view of relevant features of the monitoring device to illustrate the alignment of the relevant features with openings formed in the mounting pad, according to an example embodiment;

FIG. 17 is an example screenshot of a monitoring system software application, showing an interface for setting or adjusting alert status limits for a monitored device, according to an example embodiment.

DETAILED DESCRIPTION

Figure 1:
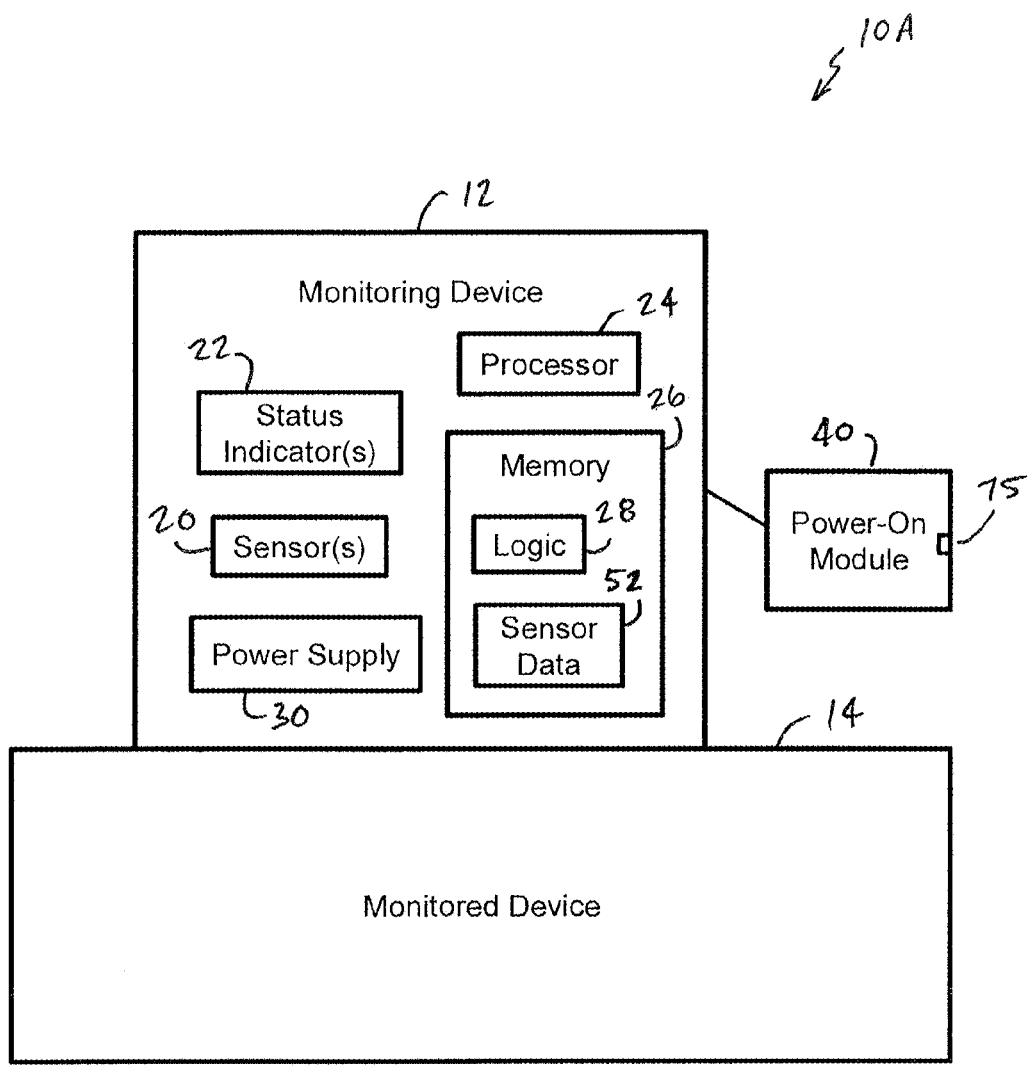
FIG. 1 shows an example monitoring system configuration including a monitoring device arranged on a monitored device, e.g., a pump, in which the monitoring device is configured to display a current and/or past status of the monitored device, according to an example embodiment.

FIG. 1 shows an example monitoring system configuration 10A including a monitoring device 12 arranged on a monitored device 14 and configured to monitor the condition of the monitored device 14, according to an example embodiment. Monitored device 14 may include any device having one or more operational parameters that may be detected and monitored. For example, monitored device 14 may be a pump, valve, motor, generator, or any other type of device or equipment. Operational parameters that may be detected and monitored may include, for example, vibration, temperature, pressure, voltage, current, noise level, and/or any other detectable operational parameters.

In some embodiments, monitoring device 12 can be retrofit to an installed monitored device 14, e.g., mounted to an exterior of an installed monitored device, such that monitoring device 12 is configured to monitor operational parameters that are detectable from the exterior of the monitored device 14, e.g., vibration, temperature, noise level, etc.

Monitoring device 12 can be directly mounted to monitored device 14 or can be mounted to a mounting pad or other mounting structure, which is in turn mounted to monitored device 14. Monitoring device 12 can be mounted to monitored device 14 or a mounting pad/structure, and the mounting pad/structure to monitored device 14, via any suitable connection techniques, e.g., using adhesive, physical connectors (e.g., bolts), or magnetic coupling. Example options for mounting monitoring device 12 to monitored device 14 are discussed below with reference to FIGS. 12 an 13.

As shown in FIG. 1, monitoring device 12 may include one or more sensors 20, one or more status indicators 22, a processor 24, memory 26 storing computer-readable logic or instructions 28 (e.g., software or firmware) executable by the processor 24, a power supply 30, and/or any other suitable components for providing any of the various functionality of monitoring device 12 disclosed herein.

Sensors 20 may include any number of sensors configured to detect or measure one or more operational parameters of the monitored device 14, and output corresponding signals, which signals are referred to herein as sensor data collected by the one or more sensors. For example, sensors 20 may include one or more of a vibration sensor configured to detect vibrations of the monitored device 14, a temperature sensor configured to detect a temperature of the monitored device 14 (or at least a temperature corresponding to a temperature of the monitored device 14), a battery voltage sensor configured to detect a voltage of one or more batteries of the monitoring device, a noise level sensor configured to detect a noise level produced by the monitored device 14, and/or any other types of sensors for collecting sensor data regarding corresponding operational parameters of monitored device 14. In some embodiments, sensors 20 include a three-axis vibration sensor configured to collect sensor data regarding vibrations in three orthogonal axes, e.g., as discussed below with reference to FIG. 10. In some embodiments, processor 24 is a microprocessor chip that includes an integrated temperature sensor, such that sensors 20 include the processor-integrated temperature sensor. Other embodiments include one or more discrete temperature sensors 20 separate from the processor 24.

In one particular embodiment, sensors 20 include a three-axis vibration sensor and a processor-integrated temperature sensor. In another particular embodiment, sensors 20 include a three-axis vibration sensor, a processor-integrated temperature sensor, and a voltage sensor.

Status indicators 22 may include any one or more devices configured to display information indicating a current and/or past status or condition of the monitored device 14, based on sensor data collected by sensor(s) 20 and processed by processor 24. As used herein, the term "display" means to indicate in a manner perceivable by human senses, including for example a visual display or an audible output, e.g., buzzers, bells, horns, and/or lights, e.g., blinking lights of varying colors. In some embodiments, status indicators 22 include one or more LEDs or other lights controlled by the processor 24 to indicate a particular condition of the monitored device 14. For example, status indicators 22 may include multiple LEDs of different colors corresponding to different conditional states of the monitored device 14.

Processor 24 may be any general purpose processor, e.g., ARM™, X86, RISC, or Z10™ type processor.

Memory 26 may comprises any form or combination of volatile and/or non-volatile computer-readable storage medium, e.g., a RAM, ROM, flash, EEPROM, or MRAM memory device. Memory 26 stores computer-readable logic or instructions 28 that are executable by the processor 24 to provide various functions, e.g., controlling the operation of sensor(s) (e.g., controlling the timing or frequency of sensor measurements), analyzing sensor data to determine a status or condition of the monitored device 14, controlling status indicator(s) 22 based on the determined status or condition of the monitored device 14, and managing or facilitating the communication of sensor data to removable accessory modules (e.g., memory module(s), a wireless transmitter module, etc.) or other external devices connected to monitoring device 12, and/or any other suitable functions. Logic or instructions 28 may be embodied as software, firmware, or otherwise embodied.

In some embodiments, memory 26 may also be configured to store sensor data 52 collected by sensor(s) 20. Sensor data 52 may include (a) sensor measurement data (e.g., raw data) and/or (b) processed sensor data, e.g., averaged data values (e.g., to increase the period of time that can be recorded on memory module 50), the determined status of monitored device 14 (e.g., stored at regular intervals or upon a triggering event such as an identified alert status or other change in status), or the results of any other sensor data processing. In some embodiments, each stored sensor measurement or processed unit of sensor data is time/date stamped, e.g., for subsequent processing or analysis.

Memory 26 may be sized and/or configured to store any suitable type(s) and amount of sensor data. For example, in some embodiments, memory 26 stores all sensor measurement data for a particular duration, e.g., the most recent day of sensor measurements, the most recent week of sensor measurements, the most recent month of sensor measurements, etc. In other embodiments, memory 26 stores only sensor measurement data for measurements that exceed a preset limit value (and thus trigger an alert condition), or sensor measurement data for measurements within a particular window of time before and/or after a detected alert condition.

Power supply 30 may include one or more batteries configured to power the various components of monitoring device, or alternatively, an interface for receiving power from an external power source, e.g., a power source of the monitored device or other external power source.

Monitoring device 12 may be configured for connection to one or more removable accessory modules, e.g., a removable power-on module, one or more removable memory modules, a wireless transmitter module, etc. In some embodiments, monitoring device 12 is configured such that removable accessory modules can be connected to monitoring device 12 in an interchangeable, or alternative, manner. For example, monitoring device 12 may include a single accessory module port such that only one removable accessory module can be connected to monitoring device 12 at any given time. As another example, monitoring device 12 may include two accessory module ports such that up to two removable accessory modules can be connected to monitoring device 12 at any given time. In other embodiments, monitoring device 12 may include three, four, or more accessory module ports.

The monitoring system may be configured and reconfigured as desired by connecting different removable accessory modules to monitoring device 12, e.g., by adding, subtracting, and/or interchanging accessory modules connected to monitoring device 12. For example, FIGS. 1-5 illustrate five different configurations of the monitoring system, referred to as monitoring system configurations 10A-10E, which are achieved by interchanging the accessory modules connected to monitoring device 12. In particular, monitoring system configuration 10A shown in FIG. 1 includes a removable power-on module 40 connected to monitoring device 12, monitoring system configuration 10B shown in FIG. 2 includes a removable memory module 50 connected to monitoring device 12, monitoring system configuration 10C shown in FIG. 3 includes a removable short-range transmitter 60 connected to monitoring device 12, monitoring system configuration 10D shown in FIG. 4 includes a removable long-range wireless transmission module 70 and removable memory module 74 connected to monitoring device 12, and monitoring system configuration 10E shown in FIG. 5 includes multiple monitored devices 14 having corresponding long-range wireless transmission modules 70 configured to wirelessly transmit to a central control center.

Figure 5:
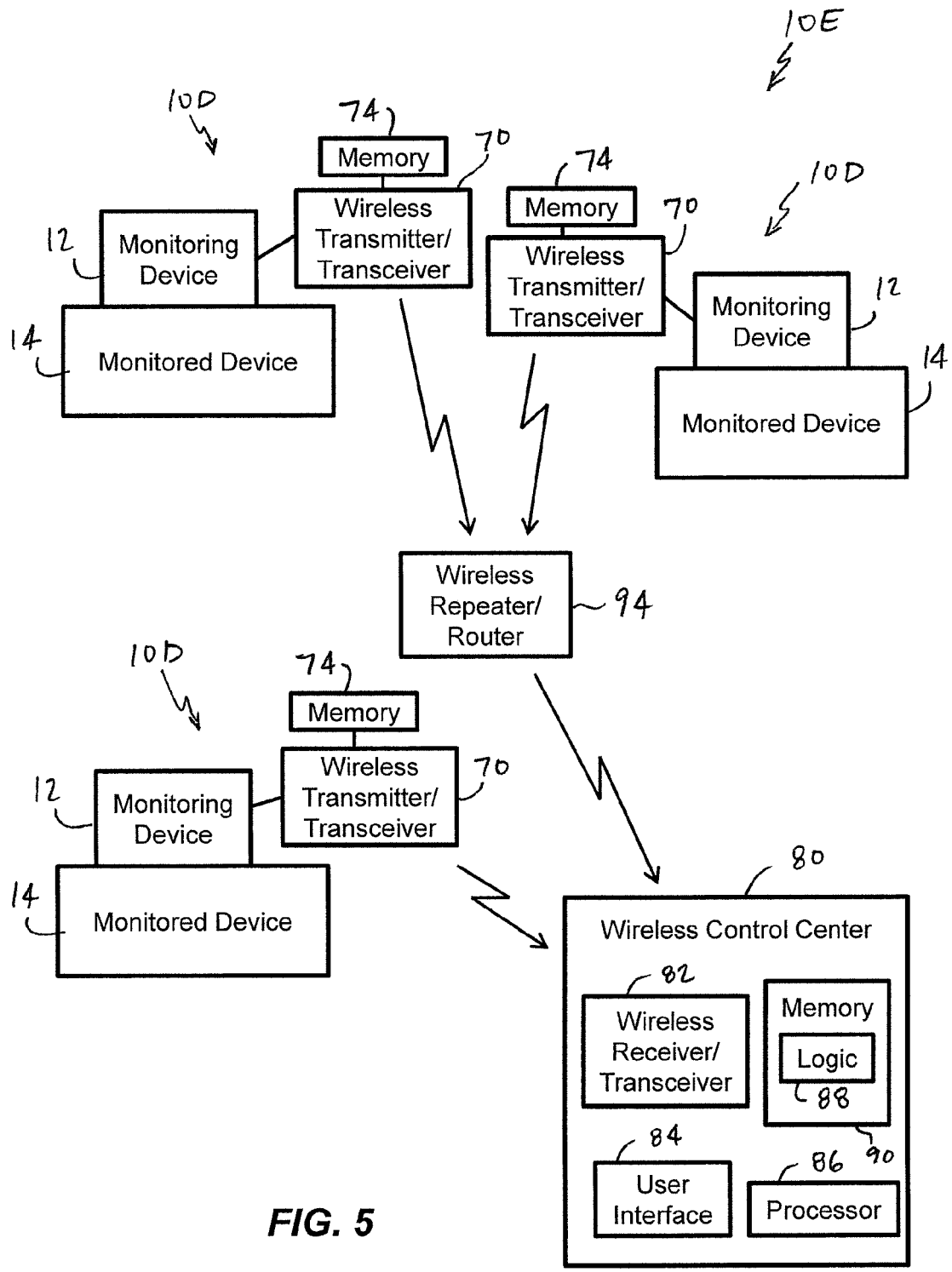
FIG. 5 shows an example monitoring system configuration including a plurality of monitored devices, each monitored by a monitoring devices having a wireless transmitter module configured to transmit sensor data to a wireless control center, according to an example embodiment.

Thus, the monitoring system may be configured and reconfigured as desired, e.g., to provide an incremental, step-wise transition from a configuration that provides for local in-person monitoring of the status of individual monitored devices 14 (e.g., monitoring system configuration 10A shown in FIG. 1) to a configuration that provides for remote wireless-network-based review of sensor data and status information of a group of monitored devices 14 at one location (e.g., monitoring system configuration 10E shown in FIG. 5).

In one embodiment, monitoring device 12 remains on a powered off state until a removable accessory module is connected to monitoring device 12, e.g., wherein the removable accessory module completes or closes a circuit in monitoring device 12 to provide power from the power supply 30 to the functional components of device 12. Thus, monitoring device 12 may automatically power on when a removable accessory module is connected and automatically power off when the removable accessory module is disconnected, and remain off until the (same or another) removable accessory module is reconnected.

Removable power-on module 40 may control the on/off status of monitoring device 12 based on whether power-on module 40 is connected. That is, monitoring device 12 automatically powers on when power-on module 40 is connected to the accessory module port 34, and automatically powers off when power-on module 40 is disconnected from port 34. Thus, power-on module 40 may contain conductors or other circuitry to complete or close a circuit in monitoring device 12 to provide power from the power supply 30 to the functional components of device 12. In some embodiments, power-on module 40 does not include memory, does not receive or transmit sensor data, and does not provide any other functionality besides passively powering-on monitoring device 12.

In some embodiments, power-on module 40 includes a data port 75 for receiving a physical connection to upload sensor data 52 stored in monitoring device 12. Thus, an operator may manually connect to data port 75 to access sensor data 52, e.g., regarding present or prior alert conditions.

When power-on module 40 is connected to monitoring device 12 such that monitoring device 12 is powered on, processor 24 may control sensor(s) 20 to take measurements at times or frequencies specified by logic 28.

Processor 24 may receive and analyze the sensor data collected by control sensor(s) 20 and determine the current status or condition of the monitored device 14 based on the analyzed sensor data, and control status indicator(s) based on the determined status or condition of monitored device 14. Processor 24 may analyze the sensor data based on any suitable algorithms and limit values specified in logic 28. For example, processor 24 may compare sensor data to one or more preset limit values (e.g., upper and/or lower limit values), and identify an alert condition if the sensor data exceeds a preset limit value. In this context, "exceeds" means above an upper limit value or below a lower limit value. In some embodiments, processor 24 compares individual sensor measurements to one or more preset limit values, and identifies an alert condition if n consecutive sensor measurements exceeds a preset limit value. In other embodiments, processor 24 compares individual sensor measurements to one or more preset limit values, and identifies an alert condition if an average value of n consecutive sensor measurements exceeds a preset limit value. In either embodiments, n may be any suitable preset number (e.g., 2, 3, 4, 5, 6, 7, 8, or any other number), which may be user configurable as discussed below.

In some embodiments, various operational aspects of monitoring device 12 may be set and/or adjusted by a user using a suitable software application, e.g., when monitoring device 12 is docked in a docking station connected to a computer, e.g., as discussed below with reference to FIG. 6. For example, any one or more of the following operational aspects may be set and/or adjusted by a user in this manner: (a) the times or frequencies of sensor measurements, (b) algorithms for determining the status or condition of monitored device 14, (c) preset limit values for determining the status or condition of monitored device 14, and (d) the number n of consecutive sensor measurements compared against one or more preset limit values, as discussed above.

Figure 2:
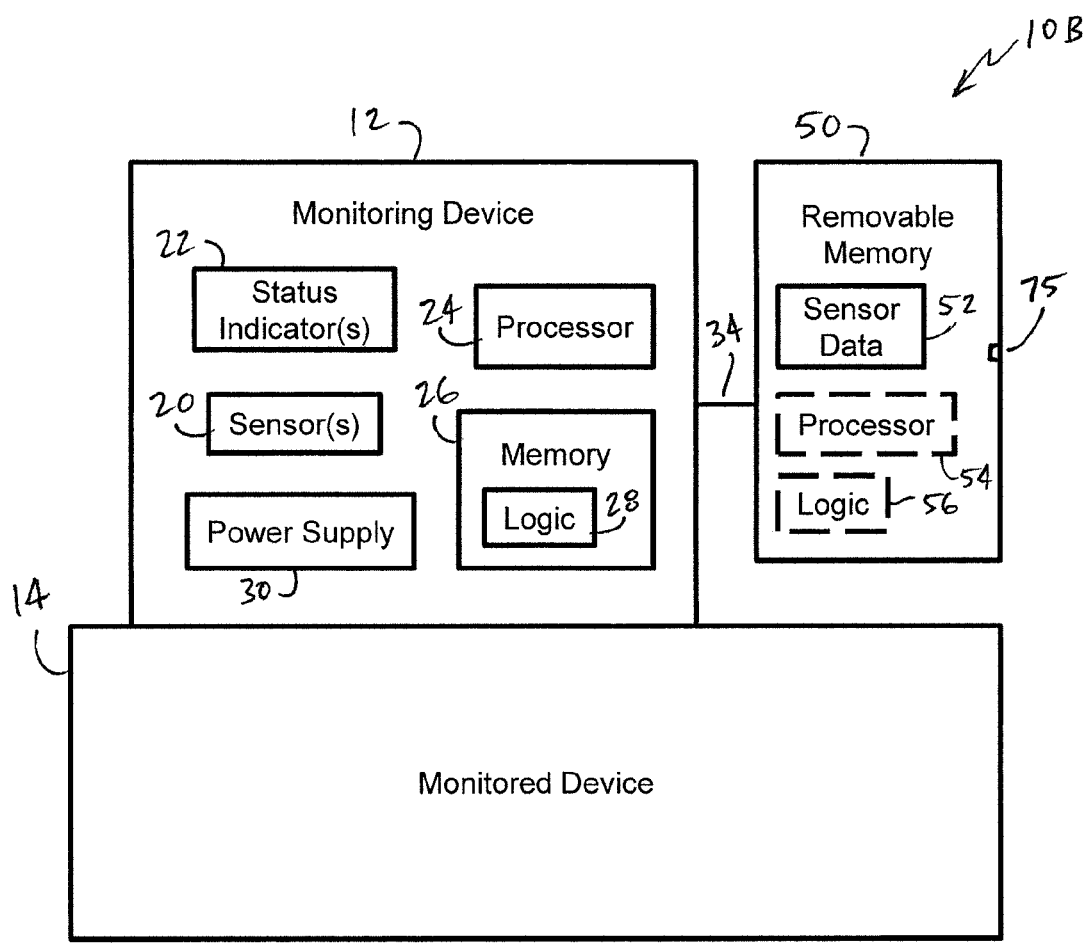
FIG. 2 shows an example monitoring system configuration including a monitoring device similar to that of FIG. 1, and further including a removable memory module configured to collect and store sensor data received from the monitoring device, according to an example embodiment.

FIG. 2 shows an example monitoring system configuration 10B, which is similar to configuration 10A shown FIG. 1, but with the removable power-on module 40 replaced by a removable memory module 50, according to an example embodiment. In the illustrated example, monitoring device 12 includes only one accessory module port 34, such that power-on module 40 must be removed (if present) before memory module 50 can be connected. As with power-on module 40, monitoring device 12 automatically powers on when memory module 50 is connected to the accessory module port 34, and automatically powers off when memory module 50 is disconnected from port 34. Thus, like power-on module 40, memory module 50 may contain conductors or other circuitry to complete or close a circuit in monitoring device 12 to provide power from the power supply 30 to the functional components of device 12.

In addition, removable memory module 50 includes one or more memory devices configured to store sensor data 52 received from the monitoring device 12 via port 34. Removable memory module 50 may comprises any form or combination of volatile and/or non-volatile computer-readable storage devices, e.g., semiconductor memory (e.g., RAM, ROM, flash, EEPROM, and MRAM), magnetic memory (e.g., magnetic hard drives, floppies, and removable drive cartridges), optical memory (e.g., CD-ROM, DVD-ROM, BLURAY™ ROM, and holographic storage), or any other type of storage device. Memory module 50 provides transient and/or persistent storage of sensor data 52.

Removable memory module 50 receive sensor data from monitoring device 12 at times or frequencies specified by logic 28. Sensor data 52 may be similar to, more comprehensive than (e.g., a superset of), or less comprehensive than (e.g., a subset of) sensor data 52 stored in the internal memory 26 of monitoring device 12. Sensor data 52 stored in memory module 50 may include (a) sensor measurement data (e.g., raw data) and/or (b) processed sensor data, e.g., averaged data values (e.g., to increase the period of time that can be recorded on memory module 50), the determined status of monitored device 14 (e.g., stored in memory module 50 at regular intervals or upon a triggering event such as an identified alert status or other change in status), or the results of any other sensor data processing. In some embodiments, sensor data 52 is transferred to memory module 50 in real time or substantially in real time (e.g., after analysis by processor 24). In some embodiments, each stored sensor measurement or processed unit of sensor data is time/date stamped, e.g., for subsequent processing or analysis.

In some embodiments, the storage of sensor data in memory module 50 may be managed by processor 24. In other embodiments, removable memory module 50 may include a processor configured to manage the storage of sensor data.

Removable memory module 50 may be configured to store any suitable amount of sensor data 52, and once full, may overwrite previously stored data according to any suitable protocol or rules, as implemented by processor 24 and logic 28, or a processor 54 and logic 56 integrated in memory module 50. For example, sensor data 52 may be stored in memory module 50 according to a FIFO protocol, such that once full, additional sensor data overwrites the oldest-stored data in memory. As another example, a predetermined time period (or a predetermined number of sensor readings) before and/or after an identified alert status may be stored and protected from being overwritten, at least until the data is uploaded onto a computer.

In some embodiments, memory module 50 may be sized and/or configured for greater data storage than internal memory 26 of monitoring device 12. For example, memory module 50 may be sized and/or configured to store at least one week of sensor data 52, or at least one month of sensor data 52, or at least three months of sensor data 52, or at least one year of sensor data 52. In some embodiments, one or more storage parameters that affect the duration of sensor data 52 that can be stored may be user-configured (e.g., while monitoring device 12 and/or removable memory module 50 are docked in a docking station interfaced with a computer-based application), such that the duration of stored data is user-configured. For example, any one or more of the following storage parameters may be user-configurable: the frequency of sensor measurement storage (e.g., store every measurement, store every other measurement, store every fifth measurement, etc.), storing only averaged values (and specifying the averaging frequency/number of measurements including in each averaging), storing vs. not storing status determinations, etc.

As mentioned above, removable memory module 50 may be manually removed from monitoring device 12 and plugged into a docking station (which may be remote from monitoring device 12) in order to upload sensor data 52 and/or to configure aspects of memory module 50 (e.g., where memory module 50 includes logic that specifies user-configurable storage parameters). A docking station and process for interfacing with removable memory module 50 via a computer-based application is discussed in greater detail below with reference to FIG. 6.

In addition, in some embodiments, removable memory module 50 includes a data port 75 for receiving a physical connection to upload sensor data 52 stored in memory module 50. Thus, an operator may manually connect to data port 75 to access sensor data 52, instead of removing and carrying memory module 50 to a docking station connected to a computer.

Figure 3:
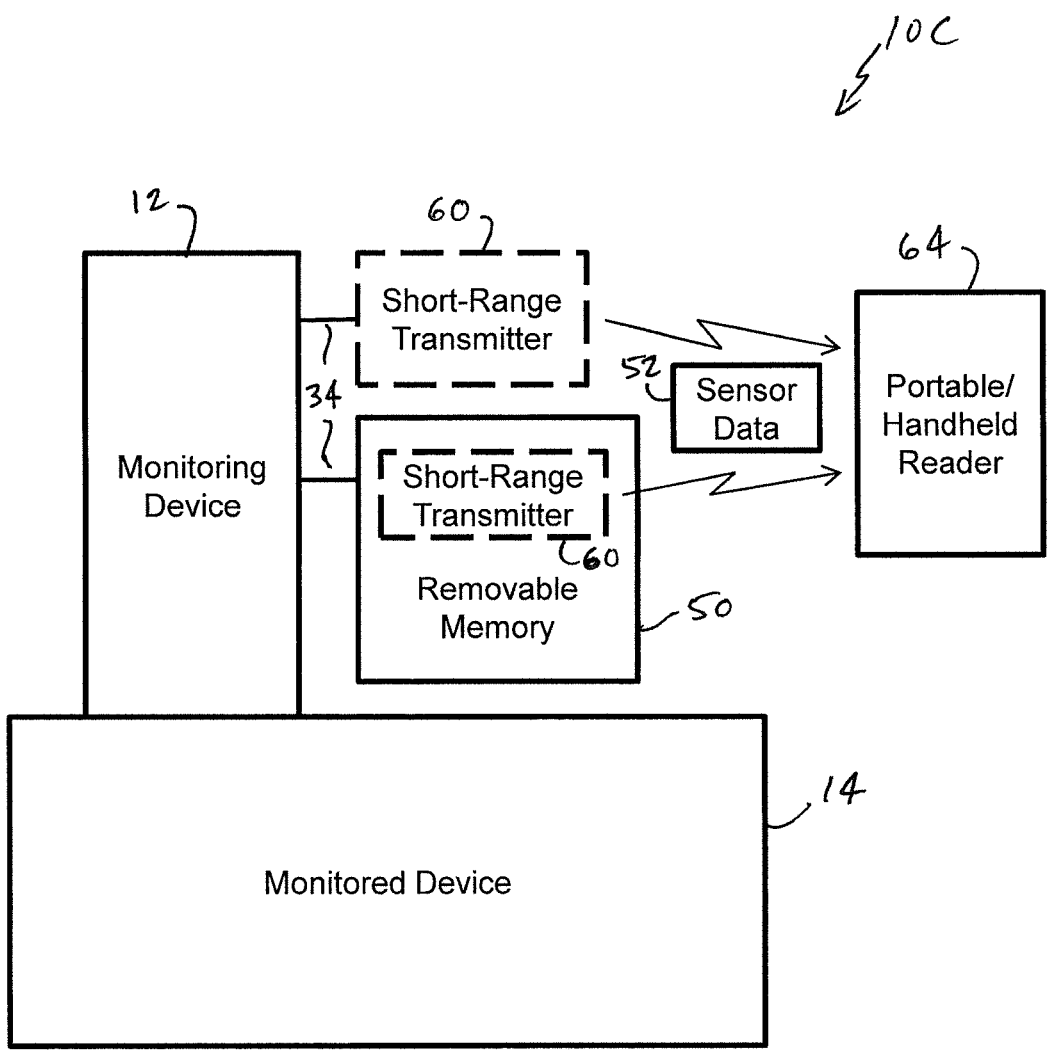
FIG. 3 shows an example monitoring system configuration including a monitoring device similar to that of FIGS. 1 and 2, and further including a short-range transmitter configured to transmit sensor data received from the monitoring device to a portable or hand-held reader, according to an example embodiment.

FIG. 3 shows an example monitoring system configuration 10C, which is similar to configuration 10B shown FIG. 2, but which includes a short-range transmission module 60 connected to monitoring device 12 configured to transmit sensor data 52 (e.g., sensor measurements and/or determined status information) to a portable or hand-held reader 64, according to an example embodiment.

In some embodiments short-range transmission module 60 is integrated in removable memory module 50. In other embodiments, short-range transmission module 60 is a discrete module, which may be connected to monitoring device 12 interchangeably with power-up module 40 and/or removable memory module 50 (e.g., where monitoring device 12 includes a single accessory module port 34), or which may be connected to monitoring device 12 in addition to power-up module 40 and/or removable memory module 50 (e.g., where monitoring device 12 includes at least two accessory module ports 34).

Where short-range transmission module 60 is integrated in removable memory module 50, transmission module 60 may transmit sensor data 52 stored in the memory of memory device 50. Where short-range transmission module 60 is a discrete module transmission module 60 may transmit sensor data 52 received or retrieved from internal memory 26 of monitoring device 12.

Short-range transmission module 60 may be configured to transmit sensor data 52 to portable reader 64 via any suitable short-range communication link. As used herein, "short-range" communications refers to wireless communication via any protocol having a standard transmission range of less than 100 feet, including, for example, RFID, Bluetooth, near-field communications (NFC), and infrared (IR) communications. Short-range communications are generally direct point-to-point wireless communications, e.g., a direct wireless link between short-range transmission module 60 and hand-held reader 64.

Short-range communications are distinguished from "long-range" communications, which as used herein, refers to wireless communication via any protocol having a standard transmission range of more than 100 feet, including, for example, standard Wireless Local Area Network (Wireless LAN) and Wireless Area Network (WAN) communication protocols, e.g., 802.11 protocols, WiFi, and GSM/GPRS communications, for example. Long-range communications may include direct point-to-point wireless communication links, or network-based wireless communications (e.g., networks including routers, repeaters, etc., mesh networks, or any other network arrangements).

For example, in one embodiment short-range transmission module 60 comprises an RFID transmitter and hand-held reader 64 comprises an RFID reader. Due to memory limitations of RFID device, some embodiments may wirelessly transmit only status information or only particular status information (e.g., alert status only), and not sensor measurement data. In other embodiments, short-range transmission module 60 and hand-held reader 64 are configured to communicate sensor data 52 via Bluetooth communications. Due to the relatively high transfer rate, such embodiments may be configured to wirelessly transmit full sensor data 52, including sensor measurement data, e.g., in an embodiment in which the Bluetooth transmitter is integrated with memory module 50. In other embodiments, short-range transmission module 60 and hand-held reader 64 are configured to communicate via any other short-range communications protocol, e.g., near-field communications (NFC).

Short-range transmission module 60 may be configured to transmit sensor data 52 to portable reader 64 upon any suitable triggering event. For example, transmission module 60 may transmit sensor data 52 to portable reader 64 automatically upon identifying the presence of portable reader 64 (and in some cases, only after an automatic handshaking or authentication process between the devices). As another example, transmission module 60 may be configured to transmit sensor data 52 to portable reader 64 only upon receiving a data request from portable reader 64. Portable reader 64 may be configured to automatically send a data request upon identification of the transmission module 60 (and in some cases, only after an automatic handshaking or authentication process between the devices), or may require a particular user input to send a data request.

Thus, assume a person carrying portable reader 64 walks around an installation including a number of monitored devices 14 having monitoring devices 12 with short-range transmitters 60. The various short-range transmitters 60 may automatically and wirelessly transmit their respective sensor data 52 to the portable reader 64 as the person walks near the various monitored devices 14, or may transmit their respective sensor data 52 to the portable reader 64 in response to the person pressing a "collect sensor data" button or other suitable interface.

Figure 4:
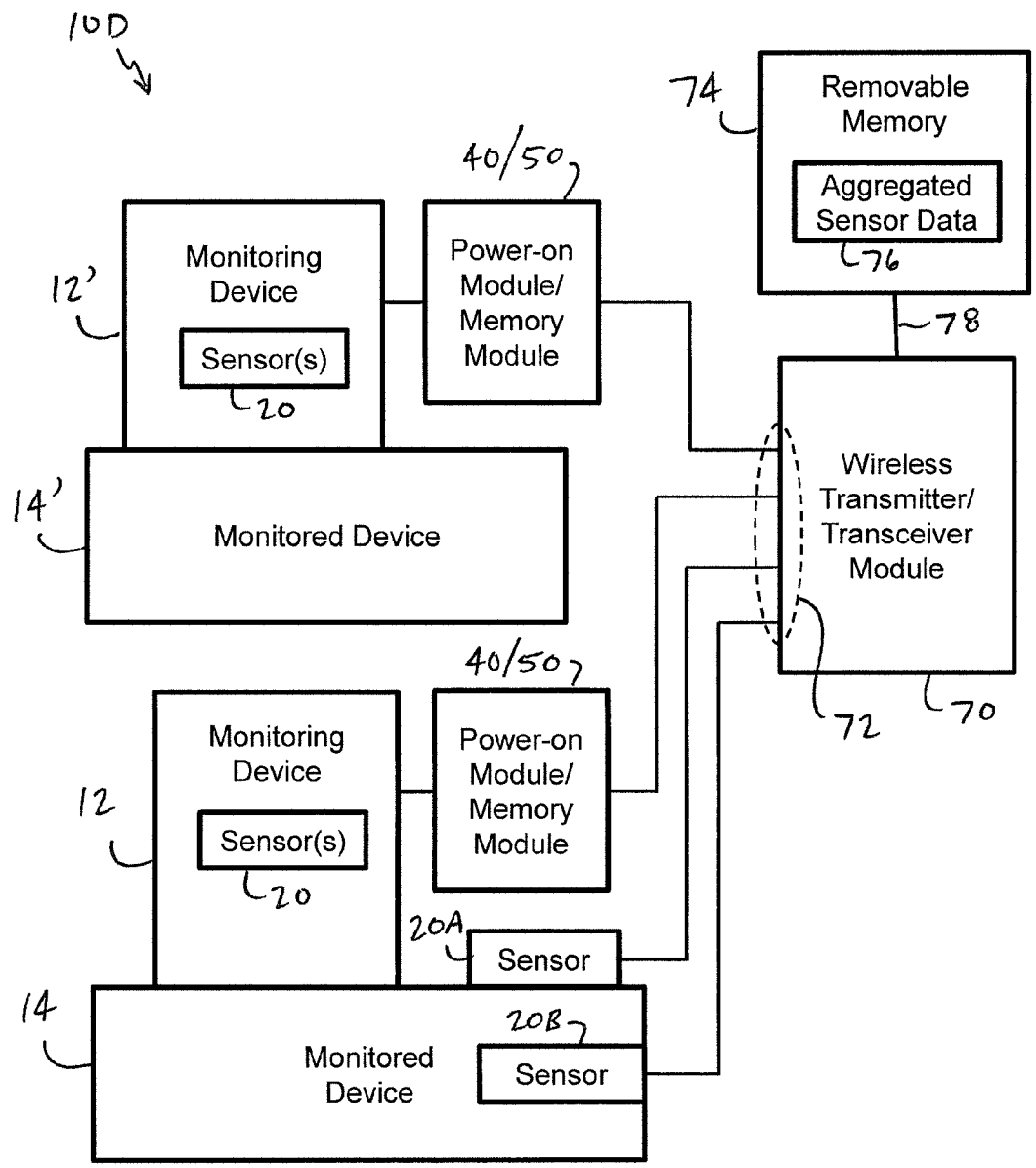
FIG. 4 shows an example monitoring system configuration including a monitoring device similar to that of FIGS. 1-3, and further including a wireless transmitter module configured to transmit sensor data received from one or more sensors of the monitoring device (and/or additional monitoring device(s)), and a removable memory module arranged to receive and store sensor data via the wireless transmitter module, according to an example embodiment.

FIG. 4 shows an example monitoring system configuration 10D including a monitoring device 12 similar to that of FIGS. 1-3, and further including a long-range wireless transmitter module 70 configured to wirelessly transmit sensor data to a receiver, and a removable memory module 74 arranged to receive and store sensor data via the wireless transmitter module 70, according to an example embodiment.

As shown, long-range wireless transmission module 70 may include multiple sensor input ports 72, each configured for connection to any of the following: (a) a removable accessory module (e.g., power-on module 40 or memory module 50) connected to monitoring device 12, (b) one or more sensors 20A discrete from monitoring device 12 and externally mounted to monitored device 14 (e.g., retrofit sensors), (c) one or more sensors 20B internally mounted within or otherwise integrated with monitored device 14, (d) sensors 20 of one or more other monitoring device 12' mounted on one or more other monitored devices 14', and/or (e) any other sensors otherwise arranged.

Thus, long-range wireless transmission module 70 may be physically connected to multiple (e.g., closely-located) monitoring devices 12, to collect sensor data regarding multiple monitored devices 14, as well as to one or more sensors external to/unaffiliated with monitoring devices 12. Thus, long-range wireless transmission module 70 may act as a sensor data aggregator by collecting sensor data, indicated as aggregated sensor data 76, from multiple different sensor sources.

Each port 72 may be configured to received data from one or multiple sensors. For example, as shown in FIG. 4, monitoring device 12 may be connected to a single port 72 (via the associated accessory module 40 or 50), such that sensor data of multiple sensors 20 integrated in monitoring device 12 (e.g., a vibration sensor and a temperature sensor) may be transferred to wireless transmission module 70 via a single port 72. Transmission of data from multiple sensors via a single port 72 may be performed using any other suitable communications protocol or technique, e.g., multiplexing, packet-based transmissions, etc.

To connect a removable accessory module (e.g., power-on module 40 or memory module 50) to wireless transmission module 70, each removable accessory module 40, 50 may include an output port 75. In some embodiments, the removable accessory module may provide a pass-through connection for transferring sensor data from monitoring device 12 to long-range wireless transmission module 70 via the removable accessory module. In other embodiments, the removable accessory module may be configured to transfer data from an integrated memory of the respective removable accessory module (e.g., from a memory device of memory module 50) to long-range wireless transmission module 70.

In other embodiments, long-range wireless transmission module 70 is a discrete module that may be connected to monitoring device 12 interchangeably with power-up module 40, removable memory module 50, and/or short-range transmission module 60 (e.g., via a port 34 of monitoring device 12).

Long-range wireless transmission module 70 may be configured to transmit sensor data 52 via any suitable long-range communication protocol (as defined above) and at any suitable frequency.

In some embodiments long-range wireless transmitter module 70 includes a diagnostics/communications port 78 to which a removable memory module 74 may be connected. Removable memory module 74 includes one or more memory devices configured to store aggregated sensor data 76 collected from various sensor sources via wireless transmitter module 70.

Removable memory module 74 may comprises any form or combination of volatile and/or non-volatile computer-readable storage devices, e.g., semiconductor memory (e.g., RAM, ROM, flash, EEPROM, and MRAM), magnetic memory (e.g., magnetic hard drives, floppies, and removable drive cartridges), optical memory (e.g., CD-ROM, DVD-ROM, BLURAY™ ROM, and holographic storage), or any other type of storage device. Memory module 74 provides transient and/or persistent storage of aggregated sensor data 76. In some embodiments, removable memory module 74 has greater storage capacity than removable memory module 50. In some embodiments, removable memory module 74 has a similar storage capacity as removable memory module 50.

Removable memory module 74 receives sensor data from long-range wireless transmitter module 70 at times or frequencies specified by logic 28, logic internal to transmitter module 70, or logic internal to memory module 74. Aggregated sensor data 76 may include (a) sensor measurement data (e.g., raw data) from one or more sensors 20 (provided by one or more monitoring devices 12) and/or (b) processed sensor data, e.g., averaged data values (e.g., to increase the period of time that can be recorded on memory module 50), the determined status of one or more monitored device 14, or the results of any other sensor data processing. In some embodiments, aggregated sensor data 76 is transferred to memory module 50 in real time or substantially in real time upon receipt and/or processing by long-range wireless transmitter module 70.

Removable memory module 74 may be configured to store any suitable amount of aggregated sensor data 76, and once full, may overwrite previously stored data according to any suitable protocol or rules, as implemented by a processor and logic provided in any respective component, e.g., according to any of the protocols or rules discussed above regarding storage of sensor data 52 in memory module 50.

In some embodiments, memory module 74 may be sized and/or configured to store at least one day of sensor data 76, or at least one week of sensor data 76, or at least one month of sensor data 76, or at least three months of sensor data 76. In some embodiments, one or more storage parameters that affect the duration of sensor data 76 that can be stored may be user-configured (e.g., while monitoring device 12 and/or removable memory module 74 are docked in a docking station interfaced with a computer-based application), such that the duration of stored data is user-configured, e.g., in a similar manner as discussed above regarding user-configurable aspects of data storage in memory module 50.

Removable memory module 74 may be manually removed from long-range wireless transmitter module 70 and plugged into a docking station (which may be remote from monitoring device 12) in order to upload aggregated sensor data 76 and/or to configure aspects of memory module 74 (e.g., where memory module 74 includes logic that specifies user-configurable storage parameters). A docking station and process for interfacing with removable memory module 74 via a computer-based application is discussed in greater detail below with reference to FIG. 6.

FIG. 5 shows an example monitoring system configuration 10E including a plurality of monitored devices 14, each monitored by a monitoring system configuration 10D as shown in FIG. 4 including a long-range wireless transmitter module 70 configured to transmit sensor data to a wireless control center 80 via any suitable network arrangement, according to an example embodiment. For example, monitoring system configuration 10E may include one or more wireless repeaters or routers 94 and/or any other network devices configured to form a wireless mesh network or any type of wireless communications network. Each wireless transmitter 70 is shown connected to a single monitoring device 12 for illustrative purposed only; it should be understood that each wireless transmitter 70 may be connected one or multiple monitoring devices 12 and/or to other sensors external or internal to one or more monitored devices 14, as discussed above with respect to FIG. 4.

Wireless control center 80 may include a wireless transmitter 82 configured to receive data from monitoring system configurations 10D, one or more user interfaces 84, a processor 86, and computer-readable instructions or logic 88 stored in memory 90 for providing the functionality of control center 80. User interfaces 82 may include any suitable displays allowing a person to view and/or analyze sensor data wirelessly received from the various monitoring system configurations 10D.

In some embodiments, monitoring system configuration 10E may be configured for two-way wireless communications. Thus, wireless transmitter 82 of control center 80 and wireless transmitters 70 of monitoring system configurations 10D may each may comprise a transceiver (or discrete transmitters and receivers) configured for two-way wireless communications. In such embodiments, user interfaces 88 may include an interface for wirelessly configuring, reconfiguring, or otherwise controlling one or more operational aspects of monitoring system configurations 10D from control center 80, either individually or collectively as a group. For example, in some embodiments, a user interface 88 may allow an operator to configure, reconfigure, or otherwise control any of the various user-configurable operational aspects of components of monitoring system configurations 10D discussed above.

In some embodiments, wireless control center 80 may provide any of the components and functionality provided by computer 120 and monitoring system application 124 discussed herein. Thus, a user may be able to access sensor data from any monitoring device, remote memory module 50, or remote memory module 50 connected to a wireless transmitter/transceiver module 70, as well as configuring or reconfiguring any operational aspects of such monitoring system components, e.g., as discussed below with respect to FIGS. 6 and 17, for example.

Figure 6:
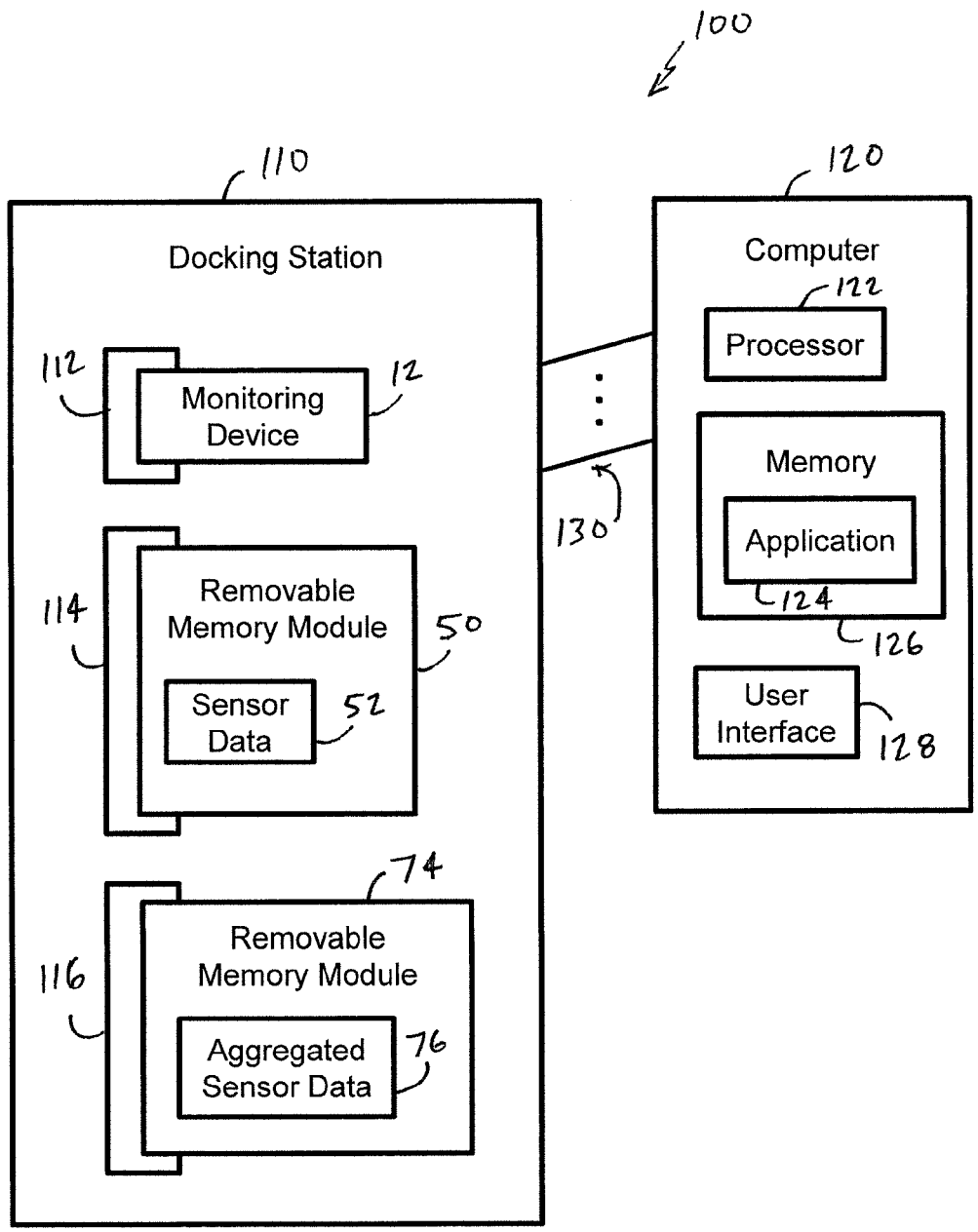
FIG. 6 shows an example system including a docking station connected to a computer, the docking station configured for docking the monitoring device and removable memory module(s), which arrangement may be used for programming the monitoring device and/or uploading sensor data from the removable memory module(s), e.g., by using an appropriate software application provided on the computer, according to an example embodiment.

FIG. 6 shows an example system 100 including a docking station 110 connected to a computer 120, according to an example embodiment. Docking station 110 may be configured for docking any components of any of the monitoring system configurations 10A-10E discussed above, and may be used for communicating between such monitoring system components and the computer 120, e.g., to upload sensor data and/or to configure or reconfigure various operational parameters of monitoring system components.

Computer 120 may include a processor 122, a monitoring system application 124 stored in memory 126, and one or more user interfaces 128, e.g., a display device, keyboard, mouse, etc.

In this illustrated example, docking station 110 includes a monitoring device dock 112 configured for docking a monitoring device 12, a first memory module dock 114 configured for docking a removable memory module 50, and a second memory module dock 114 configured for docking a removable memory module 74. Thus, monitoring system application 124 may provide an interface for uploading monitoring system sensor data 52 and/or aggregated sensor data 76 from removable memory modules 50 and/or 74 into memory 126 or other internal or external memory device, and/or for programming, configuring, or reconfiguring operational parameters of monitoring device 12, removable memory module 50 and/or removable memory module 74. Docks 112, 114, and 116 may comprise any suitable port for providing a data connection with monitoring device 12 and memory modules 50 and 74.

Docking station 110 may be connected to computer 120 in any suitable manner, e.g., by one or more data connections 130. Thus, docking station 110 may include one or more communication ports for establishing one or more data connections 130 with computer 120. For example, docking station 110 may include a separate communication port for each dock 112, 114, and 116, or a single communication port for all docks 112, 114, and 116, or any other arrangement (e.g., the arrangement provided by the example docking station 110 discussed below with reference to FIG. 15).

Data connections 130 may be embodied using any suitable connection devices and protocols. For example, in one embodiment each data connection includes a serial port (e.g., a DB-9 port) at the docking station 110 and a cable terminating in a DB-9 connector at one end and a USB connector at the other end (for connection to computer 120), with data communications being provided via USB protocol.

Figure 7:
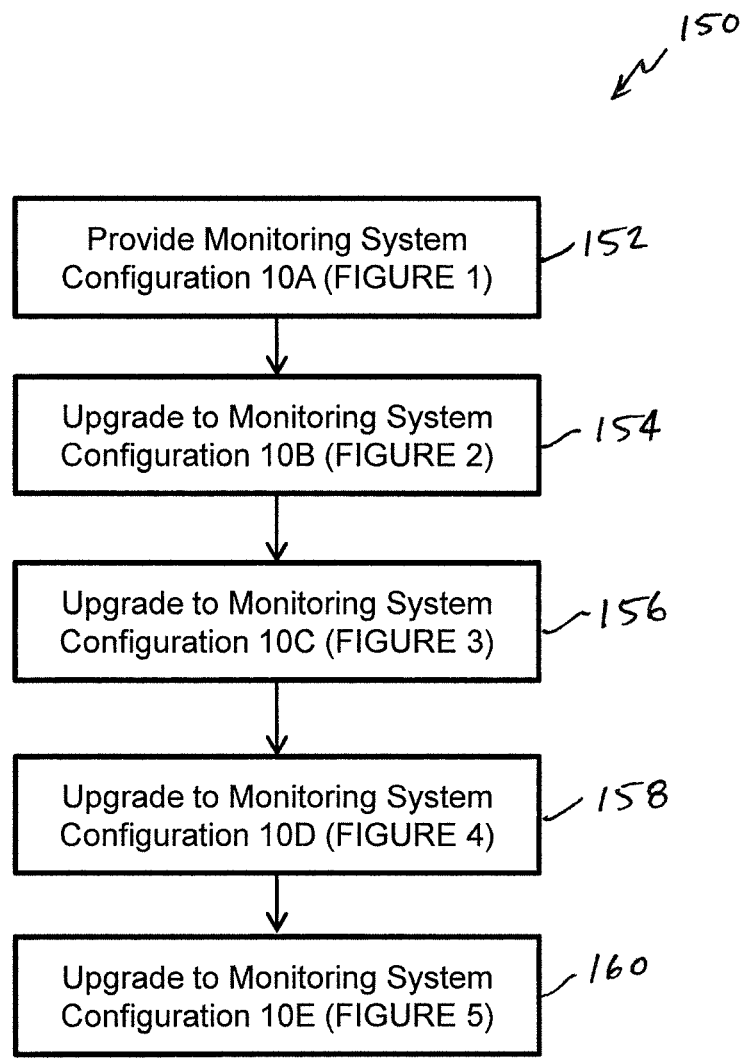
FIG. 7 illustrates a method for configuring and reconfiguring an example monitoring system into any of the configurations shown in FIGS. 1-5, e.g., to provide an incremental step-wise transition from local monitoring of the status of individual monitored device to remote wireless-network-based monitoring of sensor data of a group of monitored devices, according to an example embodiment.

FIG. 7 illustrates a method 150 for configuring and reconfiguring an example monitoring system into any of the configurations 10A-10E shown in FIGS. 1-5, e.g., to provide an incremental step-wise transition from local monitoring of the status of individual monitored devices 14 (e.g., monitoring system 10A shown in FIG. 1) to remote wireless-network-based monitoring of sensor data of a group of monitored devices 14 (e.g., monitoring system 10E shown in FIG. 5), according to an example embodiment.

Thus, method 150 may be used converting a local monitoring system user into a remote wireless-network-based monitoring system user. In a first step 152, monitoring system configuration 10A shown in FIG. 1 is arranged at each of one or more devices 14 to be monitored. This may provide a local monitoring system to a user, e.g., at a chemical and/or petrochemical plant, to monitor various parameters, e.g., vibrations, temperatures, and/or pressures, etc., of various plant equipment 14, e.g., pumps and/or reciprocating equipment, that may provide straightforward local visual status and alert notifications via one or more status indicators 22, e.g., e.g., buzzers, bells, horns, and/or lights, e.g., blinking lights of varying colors, etc.

Monitoring system configuration 10A may also provide for the recordation of status, alerts, warning notifications and/or data on local memory provided in the monitoring device 12, at the location of the monitored equipment 14. Thus, a plant quality control and/or safety manager, besides personally witnessing, e.g., hearing or seeing, e.g., a status, alert, and/or warning notification may also be informed at the location of the equipment of any prior status, alert, and/or warning notifications that occurred in relation to the equipment during periods not witnessed or unobserved by plant employees and/or managers by downloading or inspecting the status, alert, and/or warning notifications recorded on the local memory of monitoring device 12, e.g., by plugging into port 75 provided on power-on module 40.

At step 154, the user may convert the monitoring system from configuration 10A shown in FIG. 1 to configuration 10B shown in FIG. 2, by swapping out removable power-on module 40 with a removable memory module 50. Removable memory module 50 may be removed from the local monitoring device 12 for access to the recorded status/alert/warnings/data at the location of the equipment (e.g., via a portable computer), or uploading, analysis and/or storage at a remote location (e.g., via uploading via docking station 110), e.g., a plant control room and/or data room along with data collected from that equipment in the past or with other equipment in the plant.

This step may include uploading and clearing the memory module 50 or installing a new memory module 50 to replace a memory module 50 removed from the local monitoring device 12. Step 154 may provide a next step for a typical local monitoring system user for conversion toward a remote monitoring system, by providing removable memory for physical transportation to a plant control and/or data room for remote storage and analysis in context with other plant equipment and that equipment's prior recorded and stored data.

At step 156, the user may convert the monitoring system from configuration 10B shown in FIG. 2 to configuration 10C shown in FIG. 3, by swapping out removable memory module 50 with a short-range transmitter module 60 or by replacing the removable memory module 50 with a memory module 50 having an integrated short-range transmitter 60. The short-range transmitter 60 is configured to transmit sensor data to a portable (e.g., handheld) reader. Thus, step 156 may provide a next step for a typical local monitoring system user for conversion toward a remote monitoring system, by allowing the user to walk around a plant or equipment installation and wirelessly collect sensor data from multiple monitoring devices 12, without having to physically inspect or plug into each monitoring device 12 or corresponding physical memory modules.

At step 158, the user may convert the monitoring system from configuration 10C shown in FIG. 3 to configuration 10D shown in FIG. 4, by adding a long-range wireless transmission module 70 and associated removable memory module 74. The wireless transmission module 70 and associated removable memory module 74 may be connected to multiple monitoring devices 12 and/or other sensors, such that data from multiple sensor sources and/or regarding multiple monitored devices 14 is automatically aggregated and stored in a central memory and/or prepared for wireless transmission.

Thus, step 158 expands the monitoring system to include aggregating data collection with memory module 74 for receiving data via hardwire from a number of monitoring devices in a localized area in the plant. The removable memory module 74 may be removed from the local equipment (i.e., disconnected from the wireless transmission module 70) for access to the recorded status/alert/warnings/data at the location of the equipment (e.g., via a portable computer), or uploading, analysis and/or storage at a remote location (e.g., via uploading via docking station 110), e.g., a plant control room and/or data room along with data collected from that equipment in the past or with other equipment in the plant.

This step may include uploading and clearing the memory module 74 or installing a new memory module 74 to replace a memory module 74 removed from the local wireless transmission module 70. Step 158 may provide a next step for a typical local monitoring system user for conversion toward a remote monitoring system, by providing removable and/or downloadable memory that includes data from multiple monitored devices 14 for physical transportation to a plant control and/or data room for analysis and central storage.

At step 160, the user may convert the monitoring system from configuration 10D shown in FIG. 4 to configuration 10E shown in FIG. 5, by adding a wireless control center 80 and wirelessly transmitting sensor data from multiple long-range wireless transmission module 70 to the wireless control center 80. This allows a monitoring system user to access and view automatically-collected and wireless-transmitted sensor data at a central location, which may be remote from the monitored equipment. Some embodiments may allow the user to wirelessly and remotely configure operational aspects of monitoring system components from the wireless control center 80, as discussed above.

Thus, following method 150, a monitoring system user may be converted from a local monitoring system to a fully remote monitoring system without having to immediately jump from a fully local monitoring system to a fully remote monitoring system in a single step. Instead, the user may be converted by gradually introducing memory, downloadable and/or removable memory, aggregation of data collection, short-range wireless communications, and ultimately long-range wireless-network-based communications, thereby providing the user the opportunity to acclimate and gain confidence in the fully remote, wireless-network-based monitoring system.

It should be understood that method 150 represents only one example of a process for configuring and reconfiguring a monitoring system according to any of the configuration and alternatives disclosed herein. Further, a user may move between the steps of method 150 in any suitable order, which may include skipping one or more steps, or moving backwards one or more steps (e.g., based on cost or other reasons).

Figure 8:
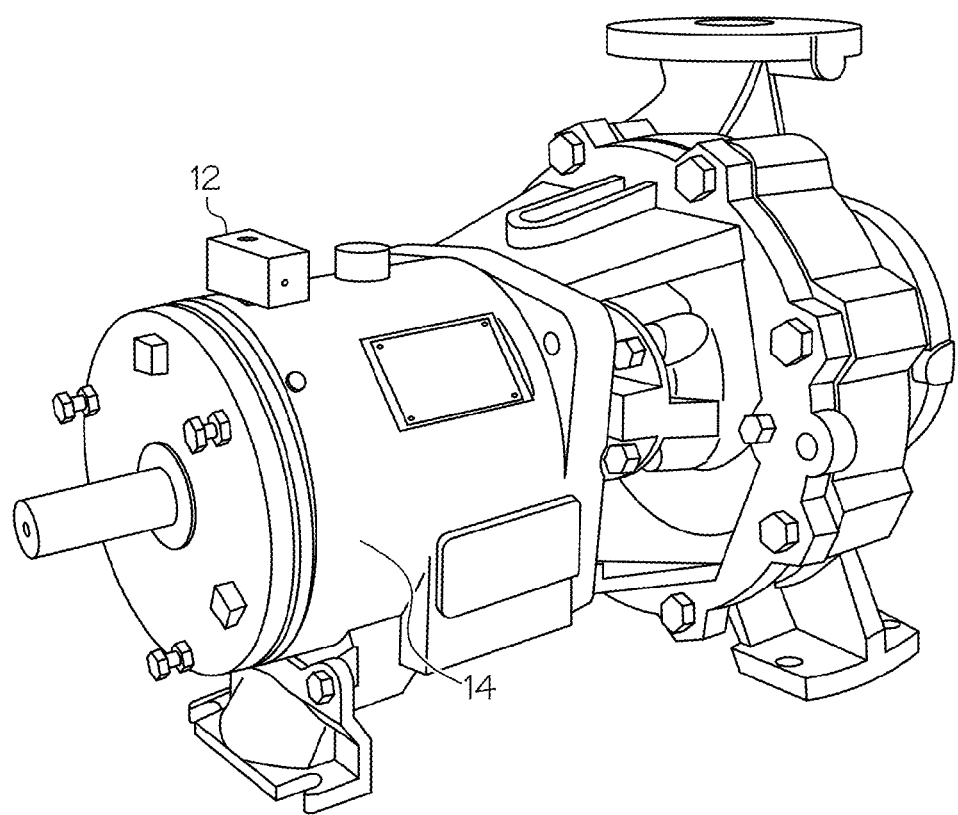
FIG. 8 illustrates an example monitoring device mounted on an example pump, e.g., to monitor vibrations and/or temperature of the pump, according to an example embodiment.

FIG. 8 illustrates an example monitoring device 12 mounted on an example monitored device 14, in this case a pump, e.g., to monitor vibrations and/or temperature of the pump, according to an example embodiment.

Figure 9:
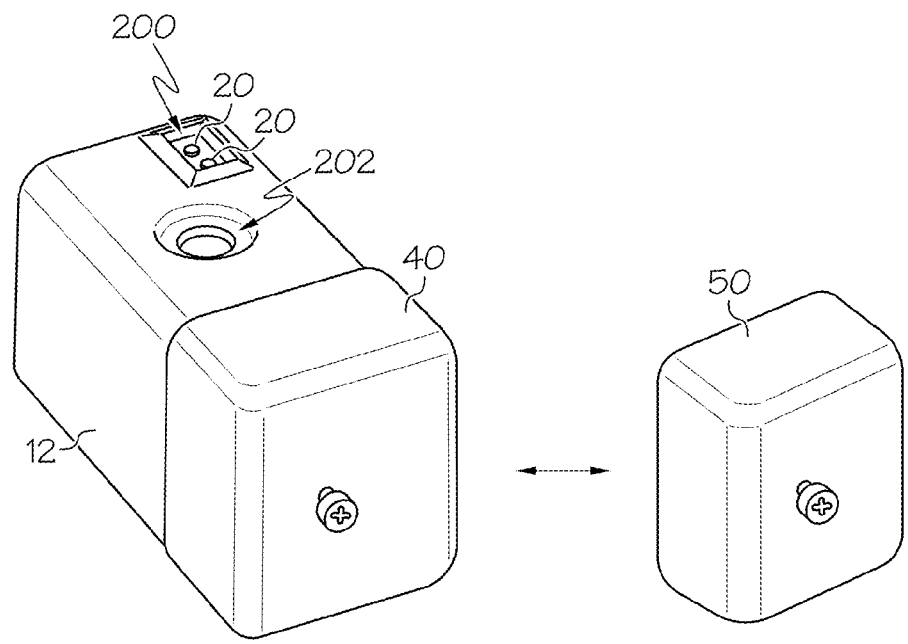
FIG. 9 illustrates an example monitoring device configured to receive, interchangeably, a removable power-on module and a removable memory module, according to an example embodiment.

FIG. 9 illustrates an example embodiment of a monitoring device 12. In particular, the figure shows an example power-on module 40 and removable memory module 50 configured to be interchangeably connected to the example monitoring device 12, e.g., corresponding to configurations 10A and 10B shown in FIGS. 1 and 2. As shown, power-on module 40 and removable memory module 50 are configured to fit over one end of the monitoring device 12 as an end cap, and connect with the relevant electronics of monitoring device 12 via an accessory module port 34 provided through an opening in the housing of monitoring device 12 (shown in FIG. 11A, discussed below).

As shown, the example monitoring device 12 includes a window 200 providing visual access to status indicators 22 embodied as a pair of LEDs. Monitoring device 12 also includes a through hole 202 for receiving a bolt or other connector to secure monitoring device 12 to a monitored device 14 or to a mounting pad/mounting device configured to mounting to a monitored device 14.

Further, the example monitoring device 12 includes two sensors 20: a three-axis vibration sensor and a temperature sensor (the latter being integral to an internal processor 24). The three-axis vibration sensor measures overall vibration readings in either acceleration (e.g., 0-10 g) or velocity (e.g., 0-1 in/s peak or RMS). The temperature sensor measures temperature readings, e.g., from −40° C. to 93° C. (−40° F. to 200° F.). Each sensor is controlled to take measurements at 5 minute intervals.

The example monitoring device 12 is powered by two ½ AA batteries, which may provide a battery life of up to four years assuming sensor measurements at 5 minute intervals.

In one embodiment, monitoring device 12 may be certified according to CE, CSA (CL 1, Div. I, Groups A, B, C, D, E, F and G), ATEX and IECEx (CL 1 Zone 0) certifications.

The housing of monitoring device 12 (and/or the respective housings of power-on module 40 and removable memory module 50) may be formed from 316L stainless steel, and window 200 may be formed from borosilicate glass to protect the underlying LEDs. The LEDs may include a green LED and a red LED and may be configured to indicate the current and/or past status of the monitored device 14 (as determined by processor 24 based on sensor data from the vibration and temperature sensors 20) according to the following protocol:
 (a) blinking greed LED indicates normal status of the monitored device, i.e., both the vibration and temperature readings are within the respective preset limits;
 (b) blinking red LED indicates a currently existing alert condition, i.e., one or both of the vibration readings and temperature readings exceed the respective preset limits; and
 (c) alternately blinking green and red LEDs indicates that the monitored device status has returned to normal status, but that an alert condition aws detected within the last 14 days.

Further, in this example embodiment, removable memory module 50 is configured to store two weeks of sensor data 52.

Figure 10:
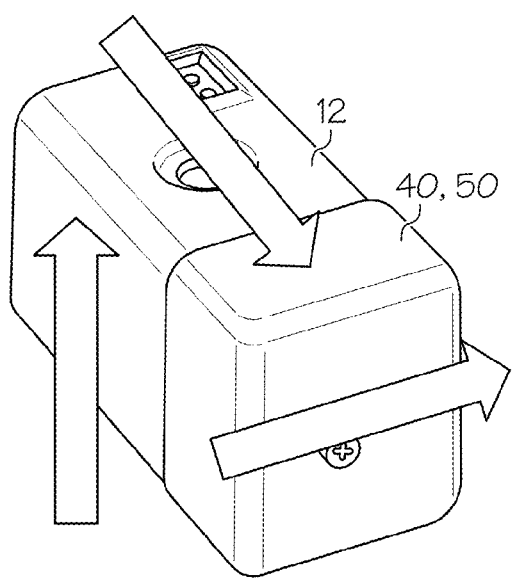
FIG. 10 illustrates an example monitoring device including a three-axis vibration sensor, including arrows indicating the three different axes of vibration sensing, according to an example embodiment.

FIG. 10 illustrates the example monitoring device 12 of FIG. 9, including three arrows indicating the three different axes (x, y, and z) of vibration detected by the three-axis vibration sensor.

Figure 11C:
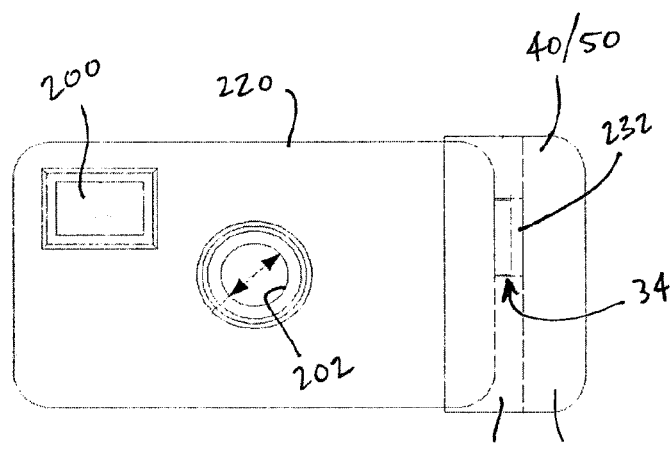
FIG. 11C is a front view of the example monitoring device and removable accessory module shown in FIGS. 11A-11B, showing the end of the bolt through hole and a display window for displaying status indications regarding a current and/or past condition of the monitored device, according to an example embodiment.
Figure 11A:
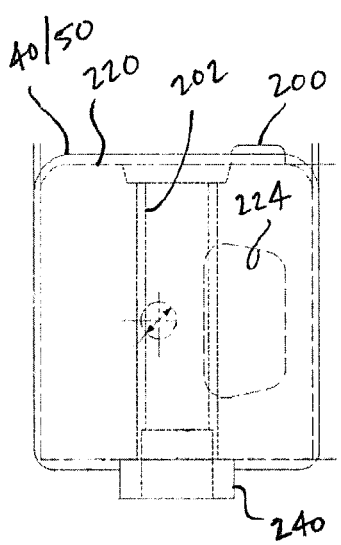
FIG. 11A is an end view of an example monitoring device and a removable accessory module (e.g., a removable power-on module, a removable memory module, a wireless transmitter module, etc.) coupled thereto, showing an opening for a physical connection between the monitoring device and the removable accessory module, according to an example embodiment.
Figure 11B:
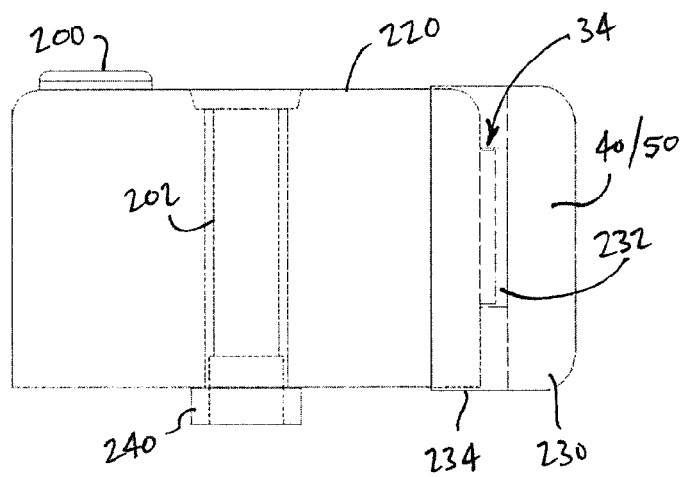
FIG. 11B is a side view of the example monitoring device and removable accessory module shown in FIG. 11A, showing a bolt through hole for securing the monitoring device to a monitored device or to a mounting pad, according to an example embodiment.

FIGS. 11A, 11B, and 11C illustrate an end view, a side view, and a front view, respectively, of a housing 220 of the example monitoring device 12 of FIG. 9, with a removable assembly module (e.g., power-on module 40 or removable memory module 50) connected to monitoring device 12.

As shown, the monitoring device housing 220 includes an opening 224 for accessory module port 34 (e.g., a DB-9 serial port) for connecting the removable assembly module 40 or 50 to the internal electronics of monitoring device 12. The removable assembly module 40 or 50 may include an electronics portion 230, a connector 232 (e.g., DB-9 connector) for connection to the accessory module port 34, and a hood portion 234 configured to fit tightly over an end of monitoring device housing 220, e.g., to protect the connection of connector 232 with accessory module port 34. The electronics portion 230 of removable memory module 50 includes one or more memory device(s) for storing sensor data 52.

Monitoring device housing 220 includes a through hole 202 for receiving a bolt to secure monitoring device 12 to a monitored device 14 or to a mounting pad/mounting device configured to mounting to a monitored device 14. Monitoring device housing 220 may also include a mounting/heat transfer structure 240 configured to help align or secure monitoring device 12 to a monitored device 14 or mounting pad and/or to provide a heat transfer path from the monitored device 14 into the monitoring device 12, e.g., to increase the effectiveness of temperature measurements by the internal temperature sensor 20. As shown, the through hole 202 passes through the mounting/heat transfer structure 240.

In some embodiments, the housing of the removable assembly module 40 or 50 may be formed from 316L stainless steel. Alternatively, in embodiments in which removable memory module 50 includes a wireless transmitter (e.g., short-range transmitter 60 shown in FIG. 3), at least a portion of the housing of removable memory module 50 may be formed from fiberglass or other material that allows the passage of wireless transmissions.

In some embodiments, monitoring device 12 can be directly mounted to monitored device 14 in any suitable manner.

FIG. 12 shows an example monitoring device 12 being mounted directly to a monitored device 14, e.g., a pump, using a bolt 250 passing through a bolt through hole 202 (see FIGS. 11A-11C) in the monitoring device 14 and into a drilled and tapped threaded hole 252 in the monitored device 14, according to an example embodiment.

In other embodiment, monitoring device 12 can be mounted to a mounting pad or other mounting structure, which is in turn mounted to monitored device 14.

FIG. 13 shows an example mounting pad 260 for mounting an example monitoring device 12, and an end view of relevant features of the monitoring device 12 to illustrate the alignment of such features with corresponding structures of the mounting pad 12, according to an example embodiment. The relevant features of monitoring device 12 may include a washer or bottom plate 244 of monitoring device housing 220, a mounting/heat transfer structure 240, and a through hole 202 passes through both structures and configured to receive a bolt.

The example mounting pad 260 includes a threaded hole 262 for receiving the bolt passing through the through hole 202 extending through the monitoring device housing 220. Mounting pad 260 also includes a enlarged-diameter recess 264 sized to receive the mounting/heat transfer structure 240 at the bottom of the monitoring device 12, e.g., to help align or secure monitoring device 12 to mounting pad 260 and/or to provide a heat transfer path from the monitored device 14 into the monitoring device 12 via the mounting pad 260. Thus, mounting pad 260 may be formed from a thermally conductive material, e.g., stainless steel.

When monitoring device 12 is secured to mounting pad 260, the washer or bottom plate 244 of monitoring device housing 220 is pressed against a top surface 266 of the mounting pad 260. A thermally conductive epoxy or other material may also be provided at this connection, to further increase thermal conductivity between the monitored device 14 and monitoring device 12.

The mounting pad 260 may be securely mounted to the monitored device 14 in any suitable manner, e.g., using an epoxy (e.g., a thermally conductive epoxy), magnetically, or using any suitable physical connectors (e.g., screws, bolts, or clamps).

Figure 14A:
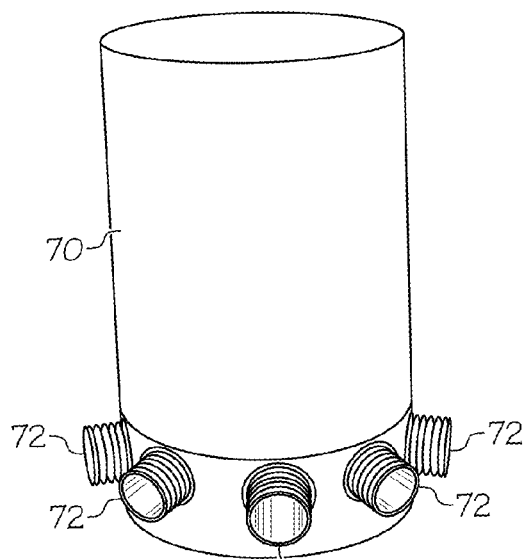
FIG. 14A is a side view of an example wireless transmitter module for use with an example monitoring device, showing multiple sensor input ports for physically connecting to one or more sensors to receive sensor data for wireless transmission, according to an example embodiment.
Figure 14B:
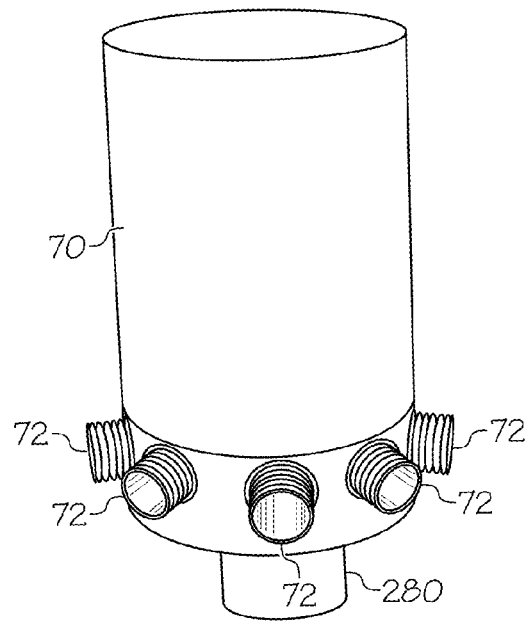
FIG. 14B shows an example mounting arrangement of the example wireless transmitter of FIG. 14A, according to an example embodiment.
Figure 14C:
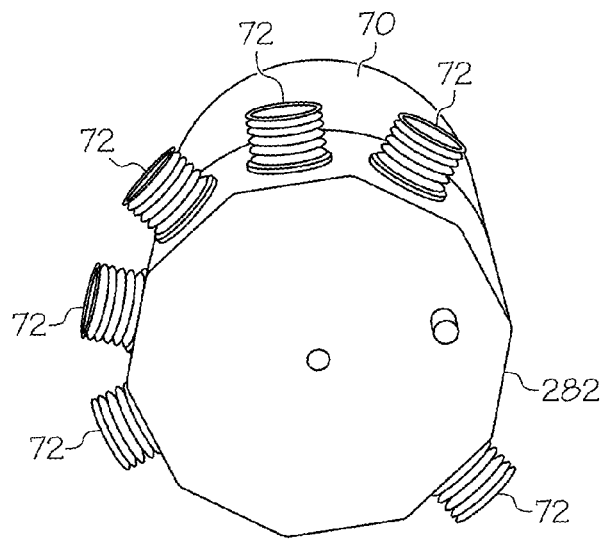
FIG. 14C is a bottom view of the example wireless transmitter of FIG. 14A, showing the multiple sensor input ports and a diagnostics/communication port for connecting a removable memory module, according to an example embodiment.

FIGS. 14A-14C illustrate an example embodiment of a long-range wireless transmitter module 70 for use with an example monitoring device 12. In particular, FIG. 14A is a side view of the wireless transmitter module 70, FIG. 14B shows an example mounting arrangement of the wireless transmitter module 70, and FIG. 14C is a bottom view of the wireless transmitter module 70.

As shown, the example wireless transmitter module 70 includes multiple (in this embodiment, five) sensor input ports 72 and diagnostics/communications port 78. Each of the five sensor input ports 72 is configured for physically connecting to up to five different sensor sources, each including one or more sensors to receive sensor data from such sensor sources. Each sensor input port 72 may be configured for connection to any of the following: (a) a removable accessory module (e.g., power-on module 40 or memory module 50) connected to a monitoring device 12, to receive sensor data from the one or more sensors 20 of that monitoring device 12, (b) one or more other sensors externally mounted to a monitored device (e.g., retrofit sensors), (c) one or more sensors internally mounted within or otherwise integrated with a monitored device, and/or any other sensors otherwise arranged.

Thus, long-range wireless transmission module 70 may be physically connected to multiple monitoring devices 12, to collect sensor data regarding multiple monitored devices 14, as well as to one or more sensors external to/unaffiliated with monitoring devices 12. Thus, long-range wireless transmission module 70 may act as a sensor data aggregator by collecting sensor data from multiple different sensor sources.

As mentioned above, each port 72 may be configured to received data from one or multiple sensors. Thus, long-range wireless transmission module 70 may be configured to process data from more sensors than the number of sensor input ports 72. In one example, long-range wireless transmission module 70 is configured to handle data from up to seven distinct sensors (total) received by the five sensor input ports 72.

Diagnostics/communications port 78 is configured for connection to a removable memory module 74, as discussed above with respect to FIG. 4. The removable memory module 74 may be configured to receive and store aggregated sensor data 76 collected by wireless transmitter module 70, as discussed above. The removable memory module 74 may be removed from the wireless transmitter module 70 and docked in a docking station to upload the aggregated sensor data 76 for analysis and diagnostics of the one or more monitored devices associated connected to the wireless transmission module 70.

Thus, in one embodiment, wireless transmitter module 70 is a wireless transmitting unit designed to monitor multiple sensor inputs and wirelessly transmit the data to a receiver. Wireless transmitter module 70 may include an omni-directional antenna (for 360° transmission), may be self-powered and thus requires no AC power, may wirelessly transmit via 900 MHz, 868 MHz, or 2.4 GHz license-free data frequency (or any other suitable frequency), and may monitor up to 7 different analog/discrete inputs (received via any or all of the five input ports 72).

In addition, the wireless transmitter module 70 may be configured to easy installation, e.g., via a mounting pole 280 (see FIG. 14B), via magnetic mounting at a magnetized bottom surface 282 of module 70 (see FIG. 14C), or in any other suitable manner.

Wireless transmitter module 70 may be a rugged unit built to withstand and operate in the most complex and harshest manufacturing environments around. Module 70 may be easy to install and connect to sensors on a wide variety of different applications. For example, module 70 can be used to efficiently and economically monitor data such as hydrocarbons, pressure, temperature, flow, volume and vibration in various types of equipment within a facility. Example applications include tanks, pipelines, pumps, fans and any other rotating equipment.

As discussed above, wireless transmitter module 70 may have a built-in omni-directional wireless antenna, allowing for reliable signal transmission. Data transmittal can occur at a customizable time interval, e.g., ranging from every 5 seconds to every few minutes. Transmission rates can also be varied according to the data values being read on the sensors, thereby prolonging battery life and only transmitting actionable data. With data alarms, module 70 can transmit data more often to allow close tracking of the equipment when required in critical situations and prevent unnecessary data overload.

In one embodiment, module 70 has a maximum data transmittal range of about ¾ mile (1.2 km) under ideal conditions, but the effective transmission range can be extended to several miles or further using a network of wireless repeaters or other network components, e.g., as discussed above with respect to FIG. 5.

Figure 15:
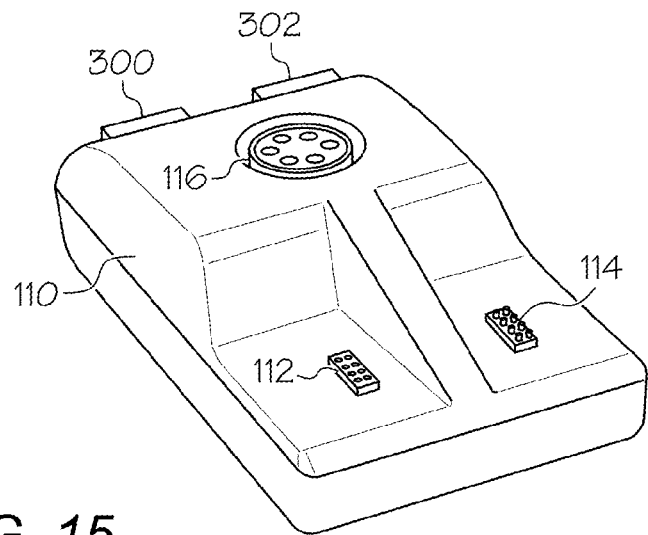
FIG. 15 shows an example docking station for connection to a computer, and including ports for docking a monitoring device and two removable memory modules, e.g., for programming the monitoring device and/or uploading sensor data from the removable memory modules via the connected computer, according to an example embodiment.

FIG. 15 shows an example docking station 110 for connecting various monitoring system components to a computer 120 having a monitoring system software application 124, e.g., for uploading sensor data and/or configuring or reconfiguring various operational parameters of monitoring system components, according to an example embodiment. (Computer 120 and monitoring system application 124 are discussed above with respect to FIG. 6, and below with respect to FIGS. 17 and 18).

In particular, docking station 110 includes a monitoring device dock 112 for (a) docking a monitoring device 12 for retrieving sensor data 52 and/or configuring or reconfiguring operational parameters of monitoring device 12, (b) a first memory module dock 114 for docking a removable memory module 50 for retrieving sensor data 52 and/or configuring or reconfiguring operational parameters of memory module 50, and (c) a second memory module dock 114 for docking a removable memory module 74 for retrieving aggregated sensor data 76 and/or configuring or reconfiguring operational parameters of memory module 74.

Docks 112, 114, and 116 may comprise any suitable port for providing a data connection with monitoring device 12 and memory modules 50 and 74. The illustrated docking station 110 is configured for an embodiment in which removable memory module 50 connects with monitoring device 12 via a male-female DB-9 connection. Thus, monitoring device dock 112 comprises a male DB-9 connector while first memory module dock 114 comprises a female DB-9 connector, such that the devices can be easily transferred from connection to each to connection to the docking station 110.

Docking station 110 may include any suitable communication port(s) for establishing one or more data connections with the computer 120. In the illustrate example, docking station 110 includes (a) a first communication port 300 for communications with both monitoring device dock 112 and first memory module dock 114, e.g., for retrieving sensor data 52 and/or configuring or reconfiguring operational parameters of monitoring device 12 and/or memory module 50, and (b) second communication port 302 for communications with second memory module dock 116, e.g., for retrieving aggregated sensor data 76 and/or configuring or reconfiguring operational parameters of memory module 74. In this example, each port 300 and 302 comprises a serial port (e.g., a DB-9 port), which is configured for connection to the computer 120 by a cable terminating in a DB-9 connector at one end (for connection to the respective port 300, 302) and a USB connector at the other end (for connection to computer 120), with data communications being provided via USB protocol.

Figure 16:
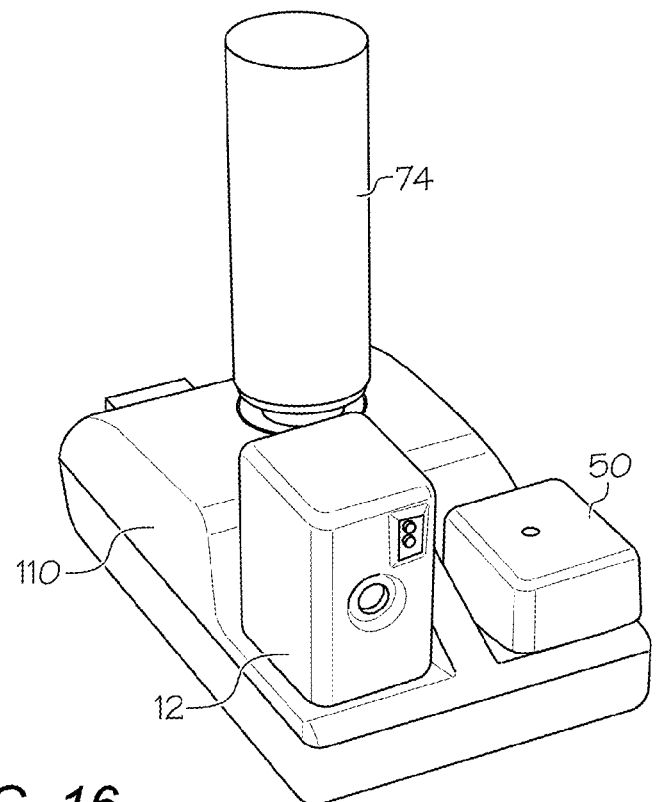
FIG. 16 shows an example docking station of FIG. 15 having an example monitoring device and two removable memory modules docked in the docking station, according to an example embodiment.

FIG. 16 shows the docking station of FIG. 15 in a loaded stated, with an example monitoring device 12, removable memory module 50, and removable memory module 74 being docked, according to an example embodiment.

Figure 17:
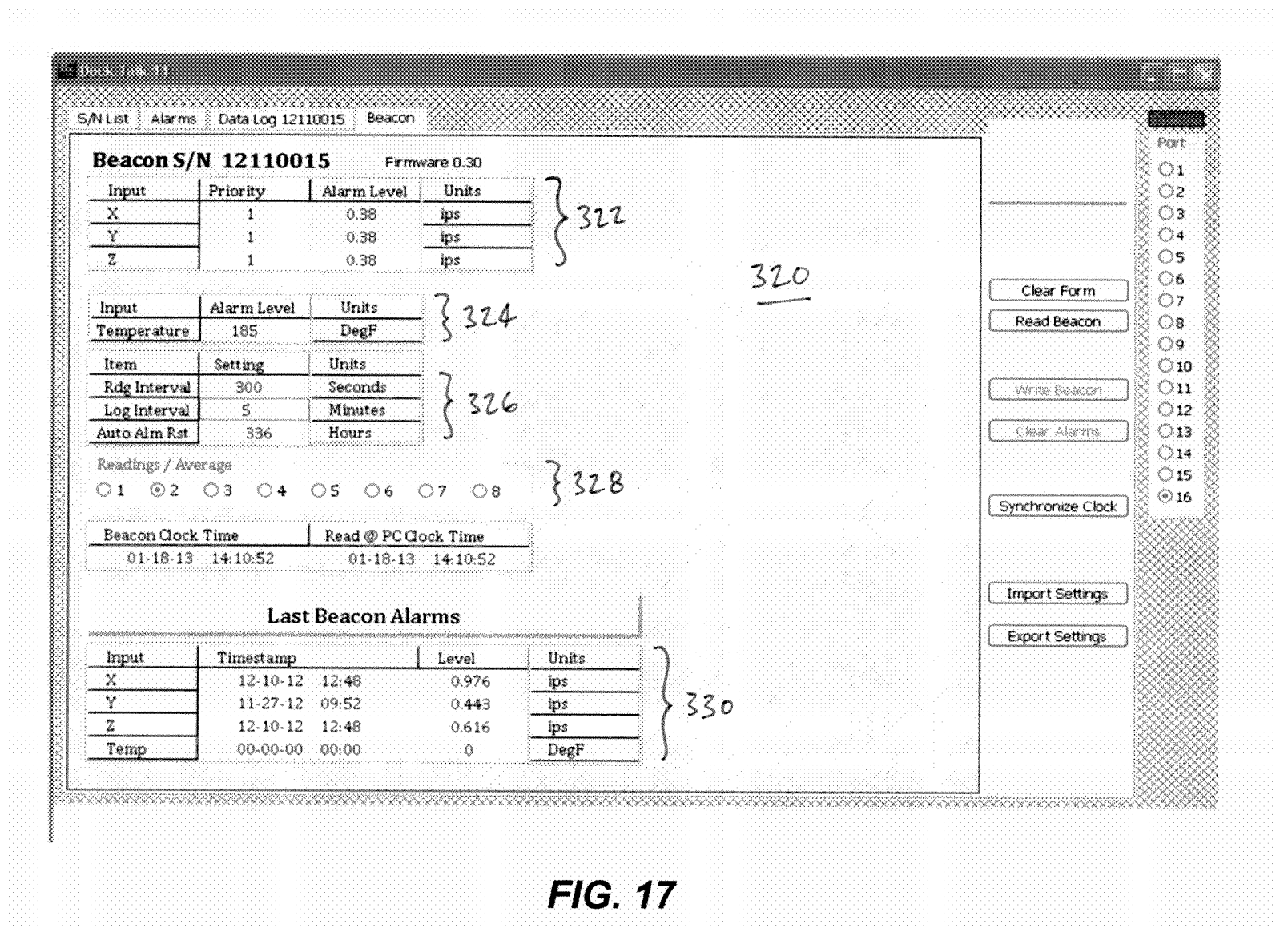

FIG. 17 is an example screenshot 320 of a monitoring system software application 124, showing an interface for setting or adjusting alert status limit values for a monitored device 12 via docking station 110, according to an example embodiment. In particular, screenshot 320 shows the following user-configurable parameters: (a) limit values 322 for a three-axis vibration sensor, (b) a limit value 324 for a temperature sensor, (c) sensor reading, data logging, and sensor reset frequency values 326, a number of consecutive sensor readings that are averaged together and compared to the respective limit values to determine an alert condition (i.e., number n discussed above with respect to FIG. 1), and a log 330 of the most recent detected alert conditions. The user may thus configure any of these parameters, which configuration changes are transferred to the internal logic of the relevant monitoring system component(s) (e.g., monitoring device 12, memory module 50, or memory module 74) via the relevant connection to docking station 110, such that the relevant monitoring system component(s) are configured or reconfigured as selected by the user.

Figure 18:
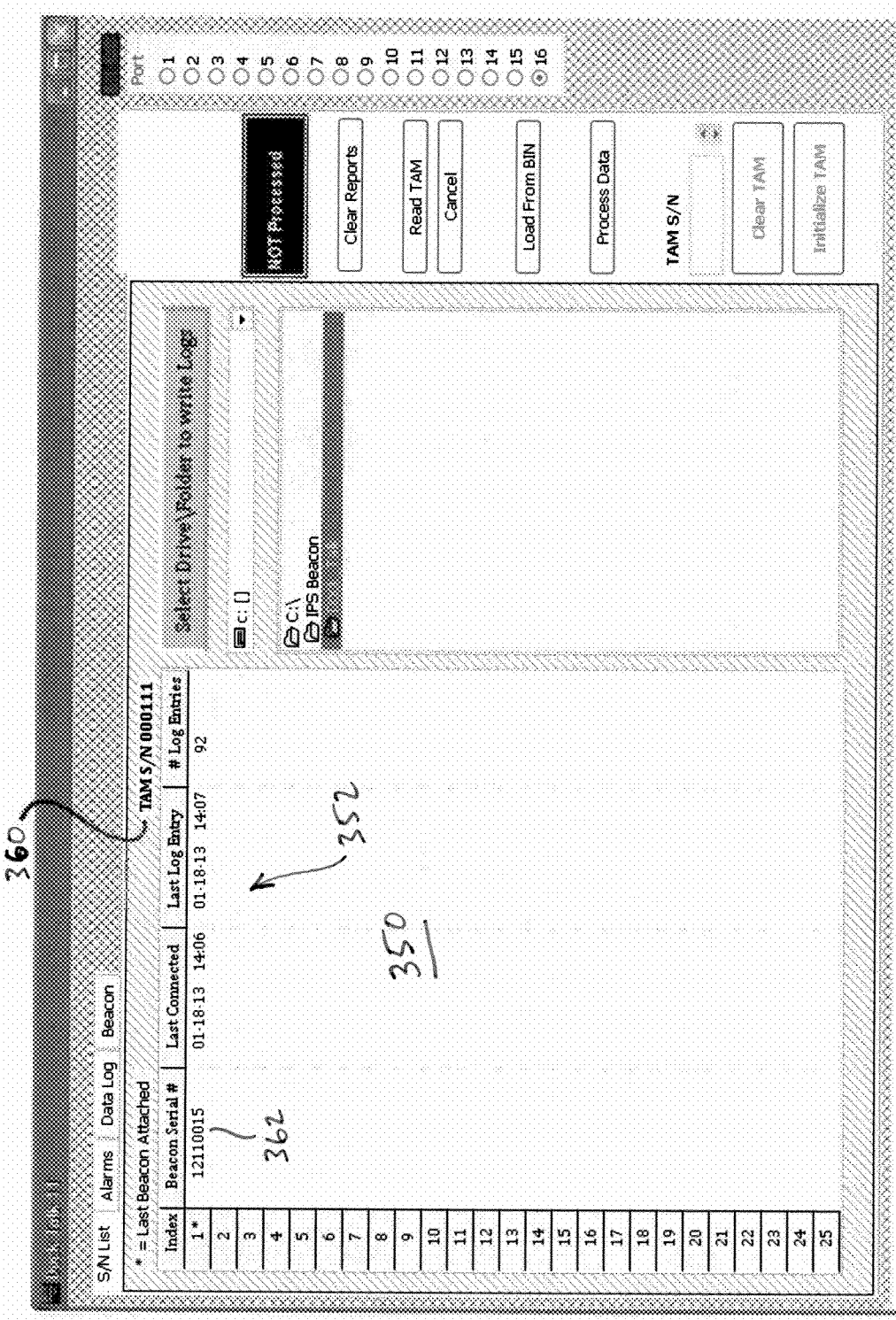
FIG. 18 is an example screenshot of a monitoring system software application, showing a log of sensor data uploaded from a removable memory module, according to an example embodiment.

FIG. 18 is an example screenshot 350 of monitoring system software application 124, showing a list 352 of one or more sensor data logs uploaded from a removable memory module 50 or 74 via docking station 110, according to an example embodiment. Because a removable memory module 50 or 74 may be connected and reconnected to different monitoring devices 12, the sensor data uploaded from memory module 50 or 74 at any given time may include multiple logs, each corresponding to a different time period and/or to a different monitoring device 12 from which the sensor data was collected. Thus, the screenshot identifies (by a reference number 360) the particular memory module 50 or 74 from which the sensor data was uploaded, and each row in the lists 352 identifies the particular monitoring device 12 (by a reference number 362) from which that sensor data log was collected, as well as the time of the last connection to that monitoring device 12, the last log entry in that log, and the number of log entries in that log. The user may select a particular log to access the individual sensor readings within that log (i.e., the 92 entries in the example illustrated log).

Although the disclosed embodiments are described in detail in the present disclosure, it should be understood that various changes, substitutions and alterations can be made to the embodiments without departing from their spirit and scope.

The invention claimed is:

1. A pump monitoring system comprising:
a monitoring device including:
one or more sensors configured to collect sensor data regarding one or more operational parameters of the pump, said sensors comprising at least one of vibration sensors and temperature sensors;
one or more status indicators;
a processor configured to:
receive the sensor data collected by the one or more sensors;
determine a status of the pump based on the received sensor data; and
control the one or more status indicators to display the determined status of the pump;
one or more batteries cooperative with the one or more sensors, one or more status indicators and processor to provide electrical power thereto; and
a housing configured such that each of the one or more batteries, one or more sensors, one or more status indicators and processor are substantially disposed therein, said housing configured to be mounted to said pump; and
a memory module removably coupled to the housing and configured to periodically receive sensor data from the one or more sensors, and store the periodically received sensor data, the memory module configured with circuitry such that the monitoring device turns on to operate said one or more sensors, one or more status indicators and said processor in response to the memory module being coupled to the monitoring device, and turns off in response to the memory module being removed from the monitoring device.

2. The monitoring system of claim 1, wherein the one or more status indicators are configured to display a first indication indicating a currently existing alert condition, and a different second indication indicating a past, non-currently existing alert condition.

3. The monitoring system of claim 1, wherein the vibration sensor comprises a three-axis vibration sensor configured to measure vibration in three orthogonal axes.

4. The monitoring system of claim 1, wherein the one more sensors include a vibration sensor and at least one of (a) a temperature sensor configured to detect a temperature of the pump and (b) a battery voltage sensor configured to detect a voltage of one or more batteries of the monitoring device.

5. The monitoring system of claim 1, further comprising a power-on module removably coupled to the monitoring device;
wherein the monitoring device turns on in response to the power-on module being coupled to the monitoring device, and turns off in response to the power-on module being removed from the monitoring device; and wherein the removable power-on module and the removable memory module are alternately couplable to the monitoring device such that only one of the power-on module and the memory module can be coupled to the monitoring device at a time.

6. The monitoring system of claim 1, further comprising:
a wireless transmitter module configured to be removably coupled to the monitoring device and configured to:
periodically receive sensor data from the one or more sensors; and
wirelessly transmit the periodically received sensor data for receipt by a receiving device.

7. The monitoring system of claim 6, wherein the removable wireless transmitter module is configured to be coupled to the monitoring device and at least one additional monitoring device having one or more additional sensors, and configured to periodically receive sensor data from the one or more sensors of the monitoring device and sensor data from the one or more additional sensors of the at least one additional monitoring device.

8. The monitoring system of claim 6, wherein the removable wireless transmitter module is configured to be coupled to the monitoring device and at least one additional sensor not provided by the monitoring device, and configured to periodically receive sensor data from the one or more sensors of the monitoring device and sensor data from the at least one additional sensor not provided by the monitoring device.

9. The monitoring system of claim 6, further comprising an additional memory module distinct from the memory module and removably coupled to the removable wireless transmitter, wherein the additional memory module is configured to receive sensor data from the one or more sensors via a physical connection provided by the removable wireless transmitter module, and further configured to store the received sensor data.

10. The monitoring system of claim 1, further comprising:
a docking station comprising:
one or more computer connection ports for connection to a computer;
a monitoring device port for physical connection to the monitoring device; and
a memory module port for physical connection to the removable memory module;
wherein each of the monitoring device port and the memory module port are coupled to at least one computer connection port to (a) enable data communication between the monitoring device and the computer when the monitoring device is physically connected to the monitoring device port and (b) enable data communication between the memory module and the computer when the memory module is physically connected to the memory module port.

11. The monitoring system of claim 10, further comprising:
a wireless transmitter module configured to be removably coupled to the monitoring device and configured to wirelessly transmit sensor data received from the one or more sensors; and
an additional memory module distinct from the memory module and removably coupled to the removable wireless transmitter, the additional memory module being configured to receive sensor data via a physical connection provided by the removable wireless transmitter module, and to store the received sensor data;
wherein the docking station further comprises an additional memory module port for physical connection to the additional memory module; and wherein the additional memory module port is coupled to at least one computer connection port to enable data communication between the additional memory module and the computer when the additional memory module is physically connected to the additional memory module port.

12. The monitoring system of claim 1, wherein:
determining a status of the pump based on the received sensor data comprises comparing the sensor data to at least one preset limit value; and
the monitoring system further comprises an interface for user-configuration of the at least one preset limit value.

13. A pump monitoring system comprising:
a monitoring device containing:
one or more sensors configured to collect sensor data regarding one or more operational parameters of the pump, said one or more sensors comprising at least one of vibration sensors and temperature sensors;
one or more status indicators; and
a processor configured to:
receive the sensor data collected by the one or more sensors;
determine a status of the pump based on the received sensor data; and
control the one or more status indicators to display the determined status of the pump;
one or more batteries cooperative with the one or more sensors, one or more status indicators and processor to provide electrical power thereto; and
a housing configured such that each of the one or more batteries, one or more sensors, one or more status indicators and processor are substantially disposed therein, said housing configured to be mounted to said pump;
a first memory module removably coupled to the housing and configured to periodically receive sensor data from the one or more sensors, and store the periodically received sensor data, the first memory module configured with circuitry such that the monitoring device turns on to operate said one or more sensors, one or more status indicators and said processor in response to the memory module being coupled to the monitoring device, and turns off in response to the memory module being removed from the monitoring device;
a wireless transmitter module configured to be removably coupled to the monitoring device and configured to:
periodically receive sensor data from the one or more sensors; and
wirelessly transmit the periodically received sensor data for receipt by a receiving device; and
a second memory module distinct from the first memory module and removably coupled to the removable wireless transmitter module, the second removable memory module being configured to:
receive sensor data via a physical connection provided by the removable wireless transmitter module; and
store the received sensor data.

14. The monitoring system of claim 13, further comprising:
a docking station comprising:
one or more computer connection ports for connection to a computer;
a monitoring device port for physical connection to the monitoring device; and
a memory module port for physical connection to at least one of the first and second memory modules;

wherein each of the monitoring device port and the memory module port are coupled to at least one computer connection port to (a) enable data communication between the monitoring device and the computer when the monitoring device is physically connected to the monitoring device port and (b) enable data communication between at least one of the first or second memory modules and the computer when the respective memory module is physically connected to the memory module port.

15. A method for reconfiguring a pump monitoring system, comprising:
   providing a monitoring device on a pump, the device including:
      one or more sensors configured to collect sensor data regarding one or more of vibration and temperature data associated with the operation of the pump;
      one or more status indicators; and
      a processor configured to:
         receive the sensor data collected by the one or more sensors;
         determine a status of the pump based on the received sensor data;
         control the one or more status indicators to display the determined status of the pump;
      one or more batteries cooperative with the one or more sensors, one or more status indicators and processor to provide electrical power thereto; and
      a housing configured such that each of the one or more batteries, one or more sensors, one or more status indicators and processor are substantially disposed therein;
   connecting a removable memory module to the monitoring device, the removable memory module configured to periodically receive sensor data from the one or more sensors, and store the periodically received sensor data, wherein the memory module is configured with circuitry such that the monitoring device turns on to operate said one or more sensors, one or more status indicators and said processor in response to the memory module being coupled to the monitoring device, and turns off in response to the memory module being removed from the monitoring device;
   connecting a removable wireless transmitter module to the monitoring device or to the removable memory module,
   connecting the removable wireless transmitter module to at least one additional source of sensor data;
   receiving at the removable wireless transmitter module (a) sensor data from the one or more sensors of the monitoring device, and (b) additional sensor data from the at least one additional source of sensor data; and
   wirelessly transmitting both the sensor data and the additional sensor data from the removable wireless transmitter module to a wireless receiver.

16. The method of claim 15, wherein connecting the removable wireless transmitter module to at least one additional source of sensor data comprises connecting the removable wireless transmitter module to at least one additional monitoring devices including one or more sensors configured to collect sensor data regarding one or more operational parameters of at least one additional device separate from the pump.

* * * * *